United States Patent [19]

Dunning et al.

[11] 4,145,739
[45] Mar. 20, 1979

[54] DISTRIBUTED DATA PROCESSING SYSTEM

[75] Inventors: Donald R. Dunning, Tewksbury; Harold S. Koplow, Lynnfield; David Moros, Winchester; An Wang, Lincoln; A. Edward Wild, Jr., Merrimac, all of Mass.

[73] Assignee: Wang Laboratories, Inc., Lowell, Mass.

[21] Appl. No.: 808,112

[22] Filed: Jun. 20, 1977

[51] Int. Cl.² ........................ G06F 3/00; G06F 9/00; G06F 15/16
[52] U.S. Cl. .................................................. 364/200
[58] Field of Search ............... 364/200 MS File, 200, 364/900, 400–407

[56] References Cited

U.S. PATENT DOCUMENTS

| | | | |
|---|---|---|---|
| 3,308,439 | 3/1967 | Tink et al. | 364/200 |
| 3,534,338 | 10/1970 | Christensen et al. | 364/200 |
| 3,564,509 | 2/1971 | Perkins et al. | 364/200 |
| 3,737,863 | 6/1973 | Rowland et al. | 364/200 |
| 3,771,135 | 11/1973 | Huettner et al. | 364/200 |
| 3,833,888 | 9/1974 | Stafford et al. | 364/200 |
| 3,972,030 | 7/1976 | Bailey | 364/200 |
| 4,003,033 | 1/1977 | O'Keefe et al. | 364/200 |

OTHER PUBLICATIONS

"Wang-The Last Word In Word Processing" - Wang Laboratories, Inc., Lowell, Mass., (Brochure) (1977).

*Primary Examiner*—Gareth D. Shaw
*Assistant Examiner*—Michael C. Sachs

[57] ABSTRACT

A distributed data processing system having a magnetic disk and a master disk control and communication control unit; a slave work station unit having a keyboard for the input of data and a cathode ray tube display screen for the display of input data; and a slave output printer. The work station display is a CRT screen which can display 24 lines each of 80 characters, or a total of 1920 characters. The keyboard is similar to that of a standard electric typewriter with the addition of special instruction keys and keys for moving a cursor symbol on the screen. Optionally, other slave peripheral devices, such as a telecommunications link, a line printer, or a paper tape punch, may be provided. All slave units of the system are connected to the master unit by coaxial cables.

Access to the disk for data reads and writes is under control of the master unit. Requests by slave devices for such access are signaled to the master unit by "semaphores", which are specific areas in slave memory that may contain particular values indicating requests for particular services. Such semaphores are set by the slave, and are periodically polled and read by the master. The requested services are provided by the master, after which the master resets the semaphore value to a quantity indicating that the requested service has been completed. In addition to disk access, slave devices may request services of other slaves; these requests are relayed by the master.

10 Claims, 19 Drawing Figures

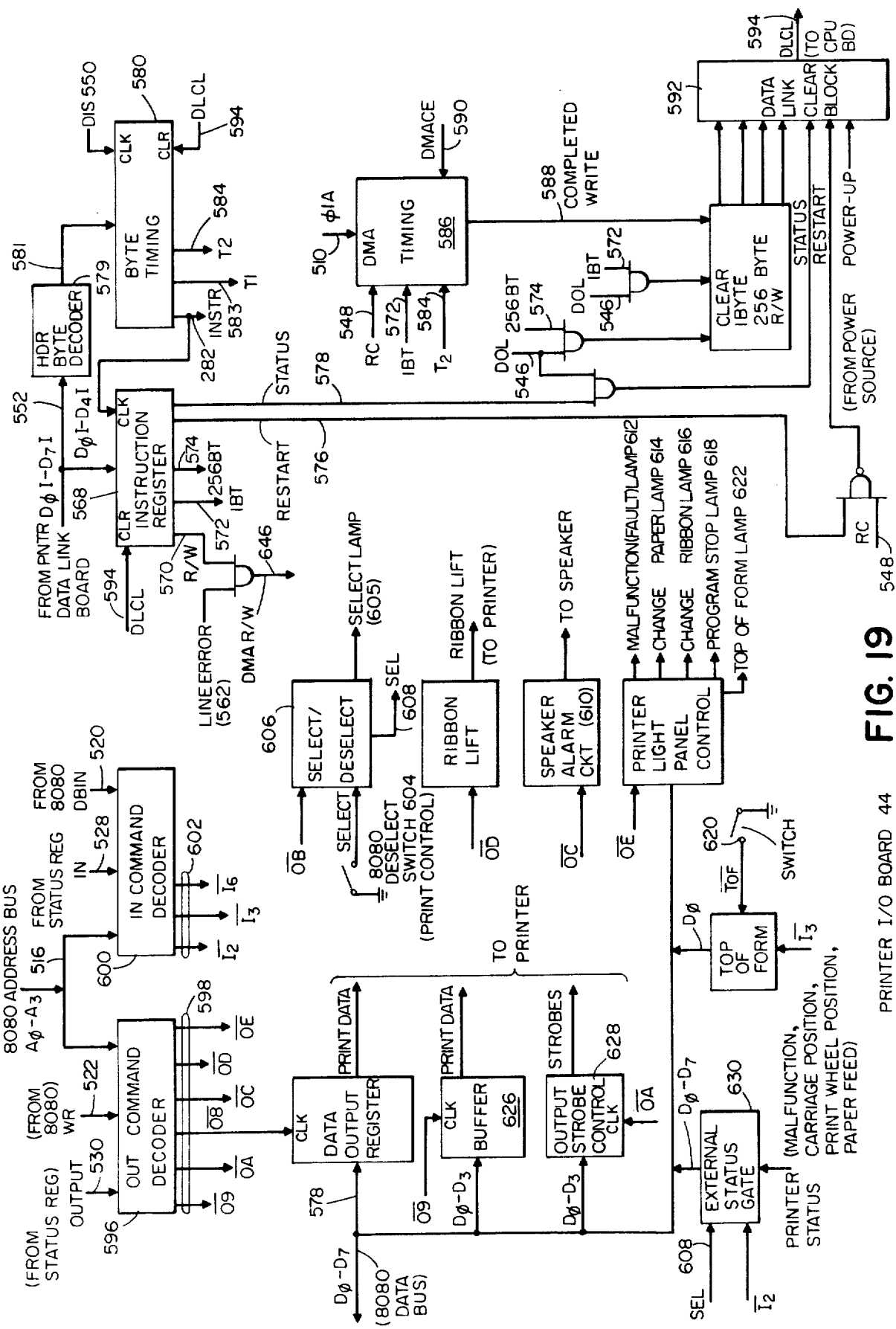

DISTRIBUTED DATA PROCESSING SYSTEM

FIELD OF THE INVENTION

This invention relates to distributed data processing systems and, more particularly, to the control of such systems.

BACKGROUND OF THE INVENTION

Distributed data-processing systems use multiple minicomputers, each performing specialized functions in order to achieve high system throughput. Such systems provide rapid performance and flexibility. Multiple processor systems contain more than one processor functioning cooperatively as part of a single overall system. Each of these processors may be executing entirely different tasks. Distributed systems contain multiple processors, each with its own executive, performing dedicated functions as part of a single partitioned system. Distributed systems may be distributed processor systems which share common memory, but they are usually distributed computer systems which use their own memories to store their specific executives.

Distributed processor systems use a static allocation of tasks. The static allocation of tasks allows very simple, specialized executives to be developed for individual processors. This isolation of tasks permits simplified development and debugging of the specific executives, and these executives may be extremely efficient.

The control mechanism forms the heart of every computer system, However, multiple processor configurations require special control functions in addition to those found in uniprocessor systems. Such control functions are required, for example, because multiprocessor systems include shared resources. A shared resource is defined as a part of the system which is required by more than one of the system elements, and therefore may be a possible source of contention. Typical shared resources are buses and devices (i.e. memory and I/O).

Hence, provision must be made to allocate access to the shared resources among the processors. In addition, provision must be made for interprocessor communication. Further, the asynchronous nature of multiple processor systems requires control functions for transferring data between processors whose operations are not synchronized. Interfacing to devices operating at different rates must also be provided.

It is therefore an object of this invention to provide a distributed data processing system that has conrol provisions for allocating access to shared resources. Further, it is an object to provide such a system that can transfer data among asynchronous devices and between devices operating at different rates.

It is an additional object to provide a data-processing system that is modular, that is, additional peripheral devices such as work stations and output printers can be readily added, removed or interchanged without reconstruction of the system hardware. It is also an object to provide such a system that can provide a wide variety of operations, without modifying the hardware.

It is also an object to provide such a system that can be easily updated to provide new operational features, without the necessity of replacing or reconstructing any portions of the hardware.

Finally, it is an object to provide an efficient data-processing system in which exchanges of data between resources and local memories can be carried out without the intervention of the dedicated processors, thereby freeing them for their assigned tasks.

SUMMARY OF THE INVENTION

The present invention provides a distrbuted data-processing system for processing informational data, generally comprising a resource memory, a master device and one or more slave devices. The resource memory has a read-only memory for storing operational instruction data for the system, and on-line storage for storing the informational data. The master device has a master central processor, a master memory, a master data link, a resource memory control unit, master internal buses interconnecting the master central processor, master memory, master data link and resource memory control unit, and initiating means, preferably reset means or switching means for connecting a source of power to the master. Preferably, there are provided first and second slave devices each having elements including a slave central processor, a slave memory, a slave data link, and slave internal buses interconnecting the elements of a slave device. Each slave memory provides a first dedicated semaphore area and each slave central processor has means to set the first semaphore area content of that slave device to a service request value indicating a request for access to one of a set of master services, including access to the resource memory.

An external data-carrying line connects each slave data link to the master data link and a resource memory data carrying line connects the master resource control unit to the resource memory.

The master central processor has means to read or write each slave memory via the external data-carrying line, the master central processor preferably being responsive to the initiating means such as an "on" condition of the switching means periodically to read the first semaphore area of each slave memory. The master central processor is then responsive to a service request value of a first semaphore area content to perform the service. In particular, the master is responsive to the resource request value to transfer data between the resource memory and the slave memory of the requesting slave device via the resource memory data-carrying line and the external data-carrying line.

Preferably, a first slave device provides a keyboard input for inputting the informational data and for inputting a print command to print particular informational data stored in the resource memory, and a second slave device provides an output printer for printing stored informational data. The second slave device memory preferably has a second dedicated semaphore area and the second slave device central processor is responsive to an "on" condition of the switching means periodically to read its second semaphore area.

The first slave device central processor is responsive to the input print command to set its first semaphore area content to a print request value. The master is responsive to the print request value of the first slave device first semaphore area content to set the second slave device second semaphore area content to a print request value. The second slave device central processor is responsive to the second semaphore area content print request value in its own memory to set its first semaphore area content to a resource request value for accessing the stored particular informational data to be printed.

For the purposes of more fully explaining the above and still further objects and features of the invention, reference is now made to the following detailed description of a preferred embodiment thereof, together with the accompanying drawings.

BRIEF DESCRIPTION OF THE DRAWINGS

FIG. 19 is a detailed block diagram of the printer input/output board.

DETAILED DESCRIPTION

Figure 1:
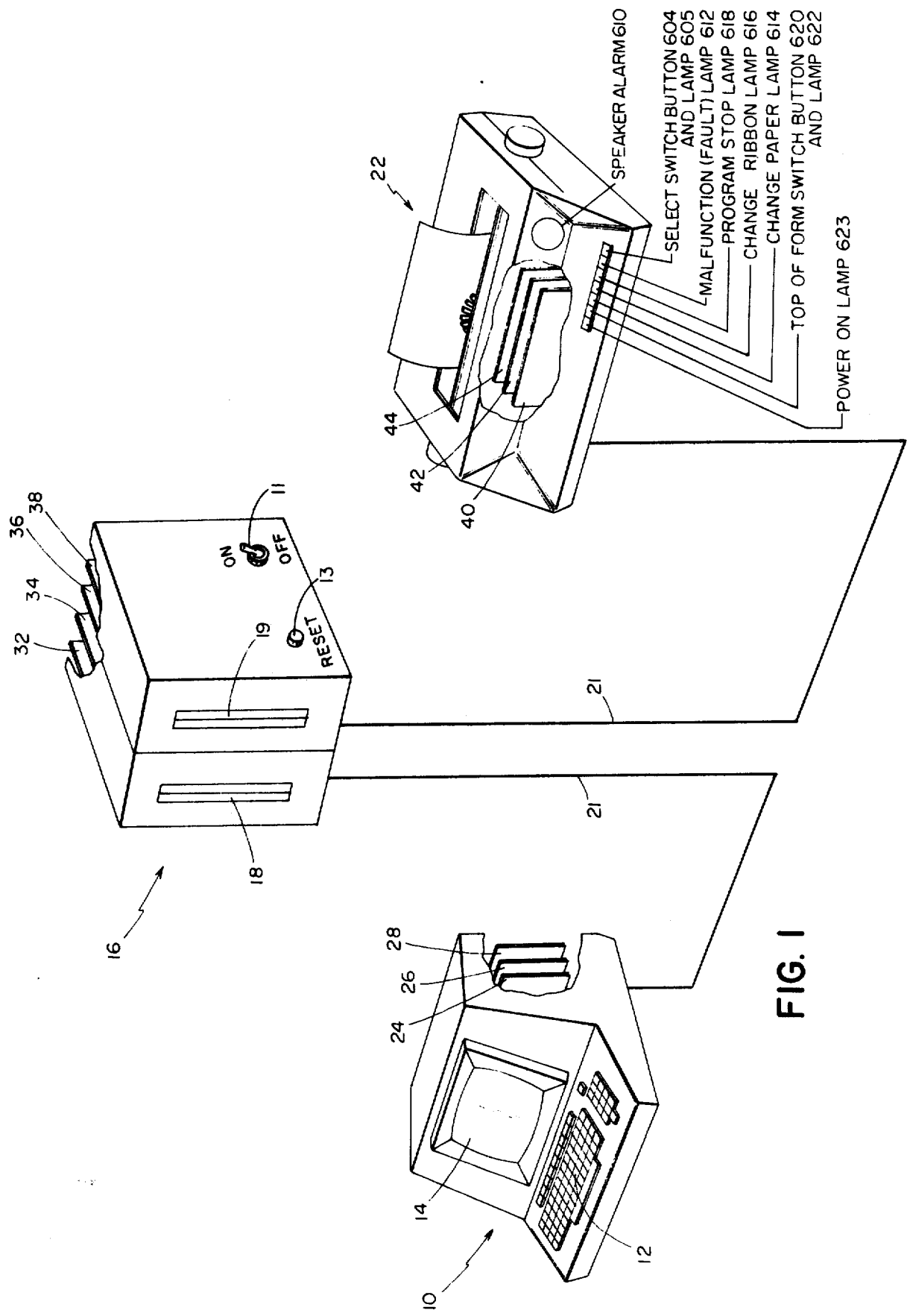
FIG. 1 is a view of the exterior of the system units, partially broken away to show the circuit boards, and with a diagrammatic indication of the connections between the units.

Referring to FIG. 1, in a specific embodiment of the invention, the system is a distributed data processing system having a master disk control and communication control unit 16; a slave work station unit 10, having a keyboard 12 for the input of data and a cathode ray tube display screen 14 for the display of input data; and a slave output printer or typewriter station 22. Optionally, other slave peripheral devices, such as additional work stations and printers, a telecommunications link, a line printer, or a paper tape punch, may be provided. All slave units of the system are connected to the master unit by coaxial cable 21.

The workstation display 14 is a screen which can display 24 lines each of 80 characters, or a total of 1920 characters. The keyboard is similar to that of a standard electric typewriter with the addition of special instruction keys and keys for moving a cursor symbol on the screen 14.

The workstation 10 includes three printed circuit boards: board 24 is the workstation memory board; board 26 is the work station central processing unit board (CPU); and board 28 is the workstation data link board.

The printer at station 22 uses a daisy print wheel, of either ten or twelve character pitch, and prints bidirectionally at speeds of up to 40 characters per second. Lamps on the printer chassis indicate printer status and switches on the chassis are used by the operator to control the operation of the printer when required. Other types of printers may also be used.

Printer station 22 has three printed circuit boards; board 40 is the printer CPU and data link board; board 42 is the printer memory board; and board 44 is the printer I/O board.

The master or control unit 16 of this embodiment includes a sealed "system" disk 18 which stores read-only operational instructions, and which provides on-line data storage capacity of up to 80 pages (200,000 characters). The system described here also includes a second "archive" disk 19 used for offline storage (archiving) of up to 120 pages (300,000 characters) of text. An ON/OFF switch 11 and a RESET pushbutton switch 13 are provided on the master unit.

The master unit 16 has four printed circuit boards; board 32 is the control unit memory board; board 34 is the control unit CPU or "master" CPU board; board 36 is the disk controller board; and board 38 is the master data link board.

Figure 2:
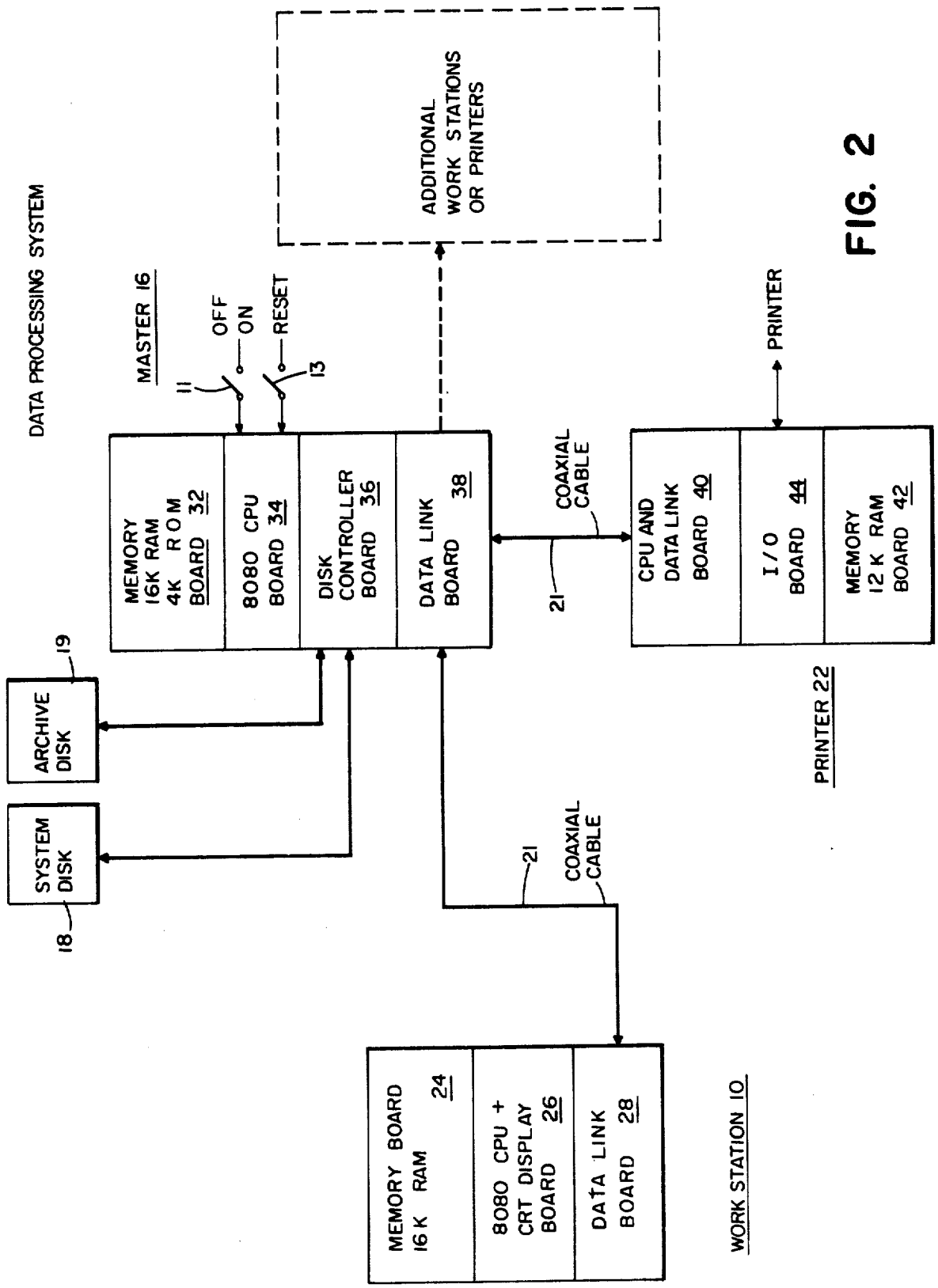
FIG. 2 is a diagrammatic showing of the connections between the circuit boards of the units.

All data is transferred through the system in bytes, either in parallel or serially. All bytes are eight-bit, except the bytes that control the print wheel and other printer operating structures, which are twelve-bit bytes. Data is transferred within each unit in parallel form, but must be serialized in the unit data link for transfer as serial data over the coaxial cable to another unit. The received data is then reformatted in parallel form for internal transfer. As is seen in FIG. 2, the coaxial cable 21 is connected between the master data link board 38 and the work station data link board 28, and between the master data link board 38 and the printer CPU and data link board 40. Data is transferred between the disks and the master disk controller board 36 in serial form over multiconductor cable.

Timing of the system is asynchronous; that is, operations of the master unit are not synchronized with those of the work station, nor with those of the printer. While all units have timing signals of the same frequency, supplied by similar timing circuits, these signals are not synchronized. In the detailed block diagrams, such similar timing signals are shown as having the same name but different reference numerals for different units. Disk timing is separately determined by a disk timing clock.

When data is transferred between processors, the data is resynchronized in the data link of the receiving unit in order to be compatible with the timing of the processor using the data. Data is transferred serially over the interconnecting coaxial lines at a rate of approximately 4.28 MHz. Disk read or write operations are much slower than these transfers, as will be described below.

Figure 11:
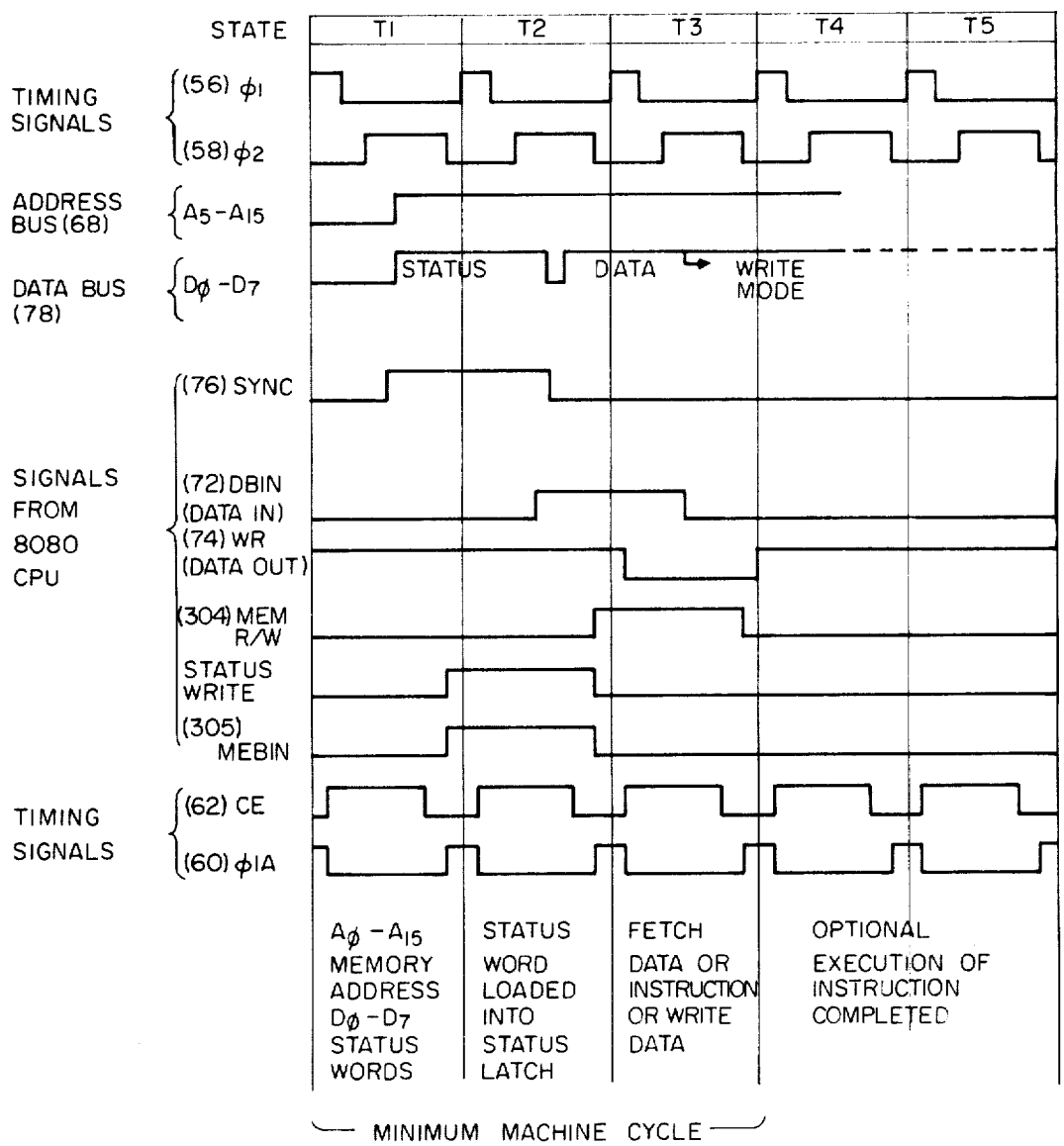
FIG. 11 is an illustrative timing chart for the microprocessors used in the system.

Each unit, master or slave, has an "Intel (R) 8080" microprocessor in its central processor unit, whose operation is described in more detail in the "Intel (R) 8080 Microcomputer Systems User's Manual", published by Intel Corporation, July 1975. The timing of the operations of such a microprocessor is also described in detail therein, and will not be explained in detail herein. FIG. 11 shows timing relationships for the basic instruction cycle of an 8080 microprocessor.

These timing relationships are illustrative of the operation of the master and of all slave components of the system.

Buses

The following conventions have been adopted to refer to data carried on internal buses throughout the system:

Master

D0M - D7M — 8 data bits on bidirectional data bus

A0 - A15 — 16 address bits on address bus from microprocessor to master memory

DI0 - DI7 — 8 data bits out of memory or FIFO output latch 272 to Disk Controller board 36

DF10 - DF17 — 8 data bits in from FIFO input buffer 260 to memory or to FIFO memory SLD - serial data in from slave to serial/parallel register 254

SO0 - SO7 — reformatted parallel data (8 bits) from serial/parallel register 254

DO0 - DO7 — 8 data bits from Disk Controller board 36 to FIFO input register 260

DF0 - DF7 — 8 data bits out from FIFO memory 268 to output latch 272

A0M - A15M — 16 address bits on DMA address bus

Work Station

D0 - D7 — 8 data bits on 8080 data bus from microprocessor 310 to work station memory and from memory to data link A0 - A15 — 16 address bits on 8080 address bus DMA0 - DMA15 — 16 address bits on DMA address bus D0I - D7I — 8 data bits on DMA data bus in from data link to RAM Printer D0 - D7 — 8 data bits on 8080 data bus from microprocessor 500 to printer memory and data link A0 - A15 — 16 address bits on 8080 address bus DO0 - DO7 — 8 data bits out from memory to serial/parallel register 538 (for DMA transfer out to Master)

D0I - D7I — 8 data bus transferred into printer by DMA operation; on bus from serial/parallel register 538 to instruction register and byte timing (FIG. 19), also to memory address latches.

Figure 3:
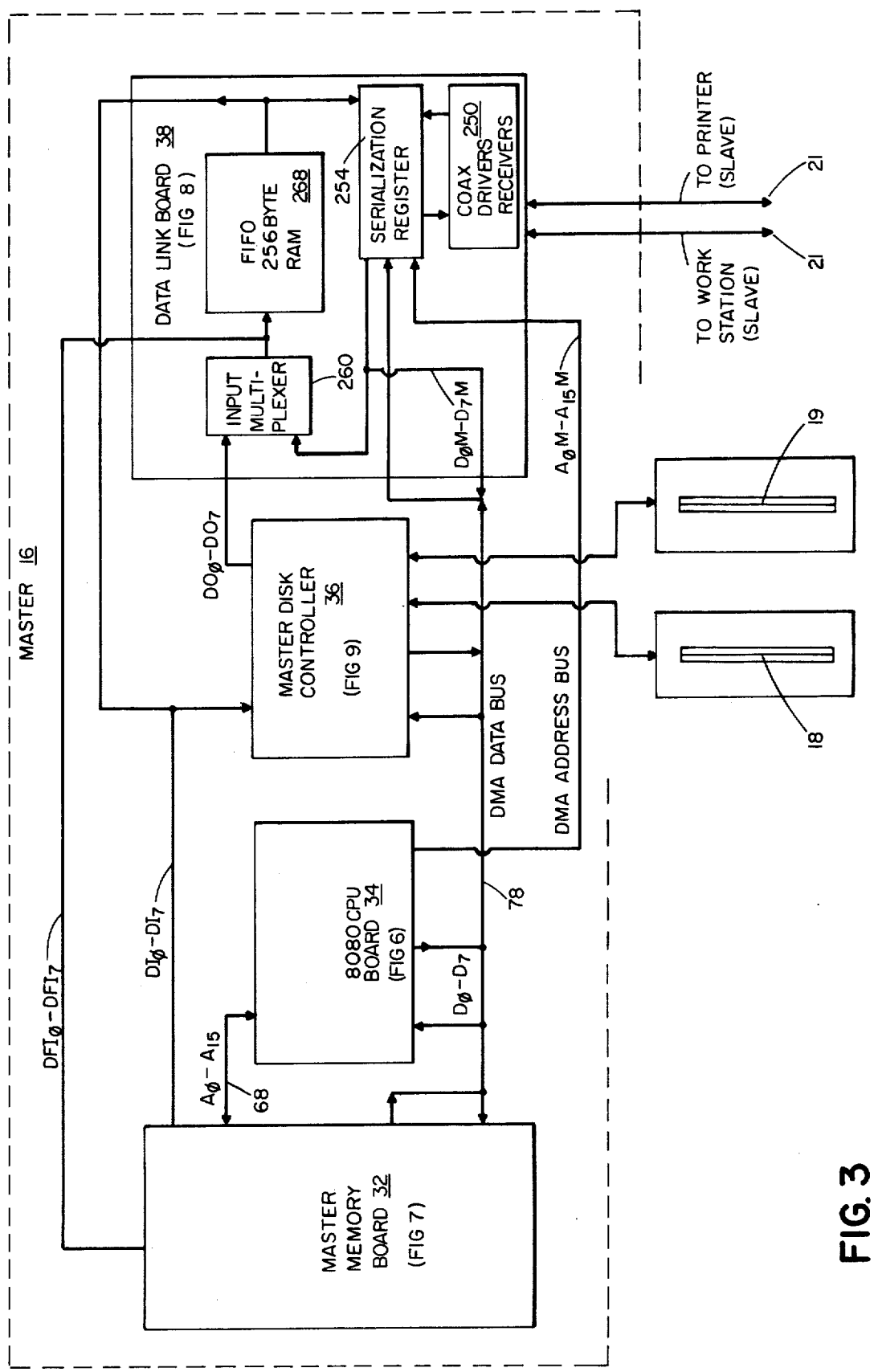
FIG. 3 is a simplified block diagram of the master unit showing its internal data and address buses.
Figure 4:
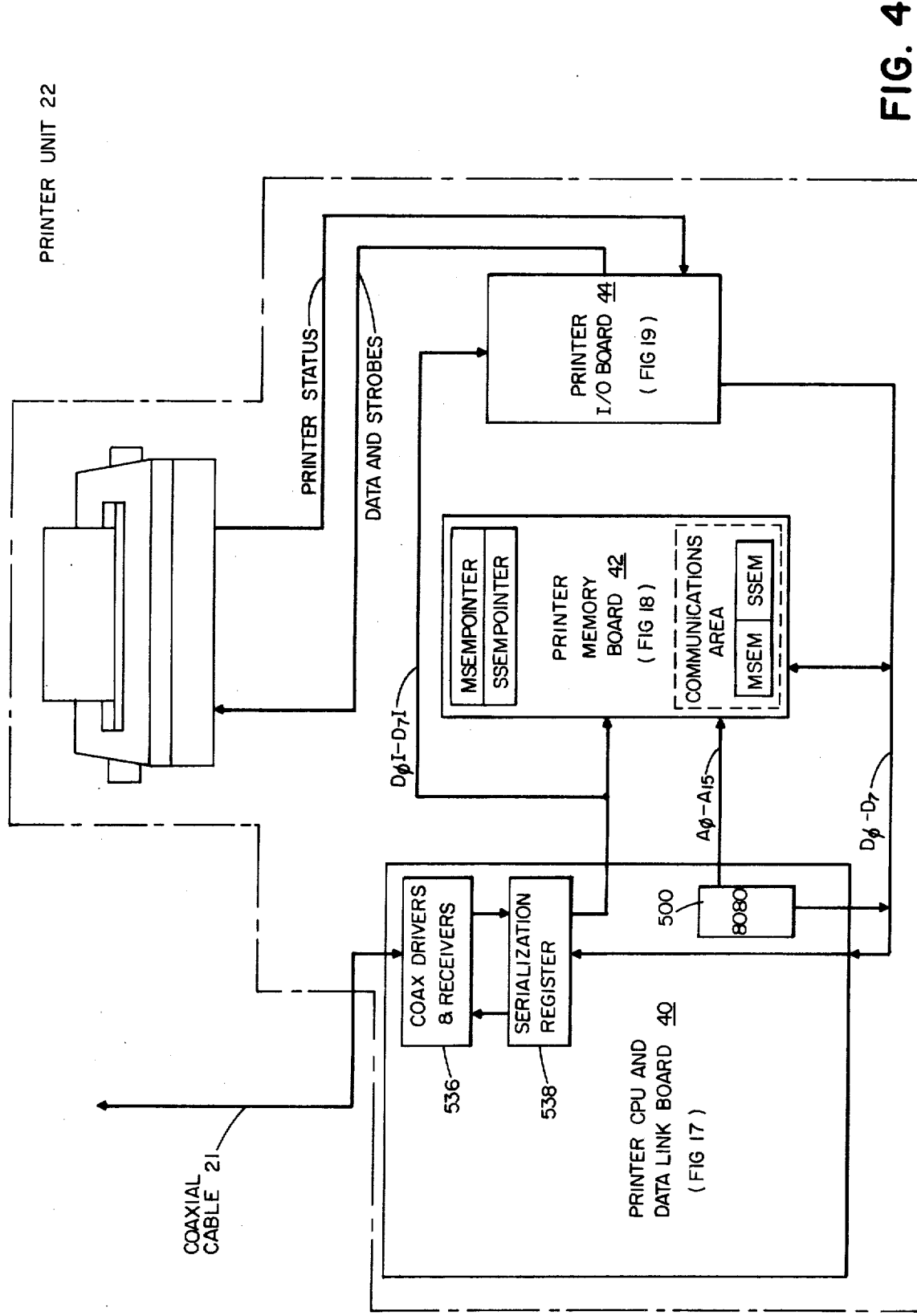
FIG. 4 is a view of the printer unit similar to FIG. 3.
Figure 5:
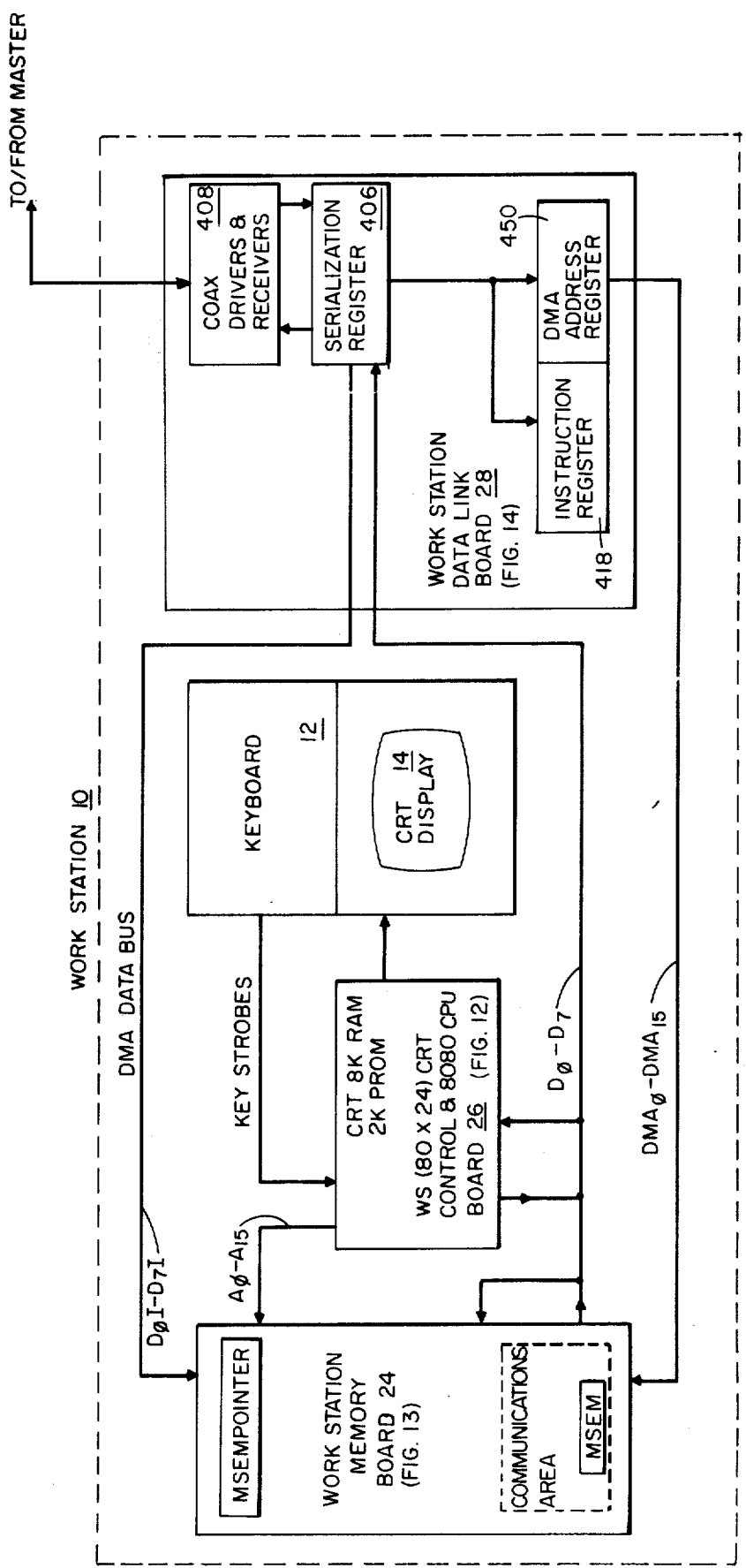
FIG. 5 is a view of the work station unit similar to FIG. 3.

These buses are seen in the simplified block diagrams of FIGS. 3, 4 and 5, showing the internal connections of each unit.

Master Unit 16

The Master unit 16 controls all communications with slave devices and controls all operations involving the disks.

Figure 6:
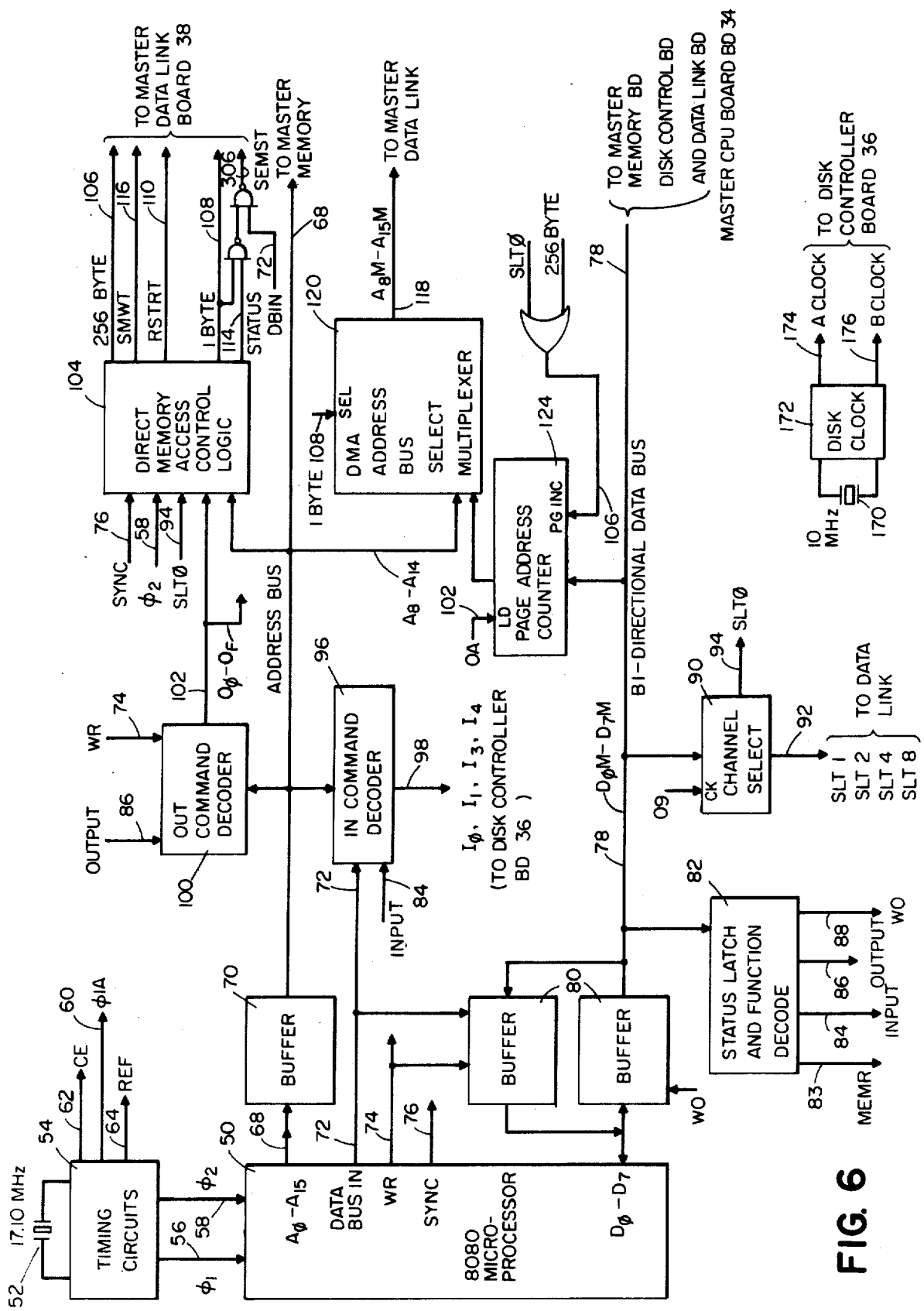
FIG. 6 is a detailed block diagram of the circuit elements of the master central processor board.
Figure 7:
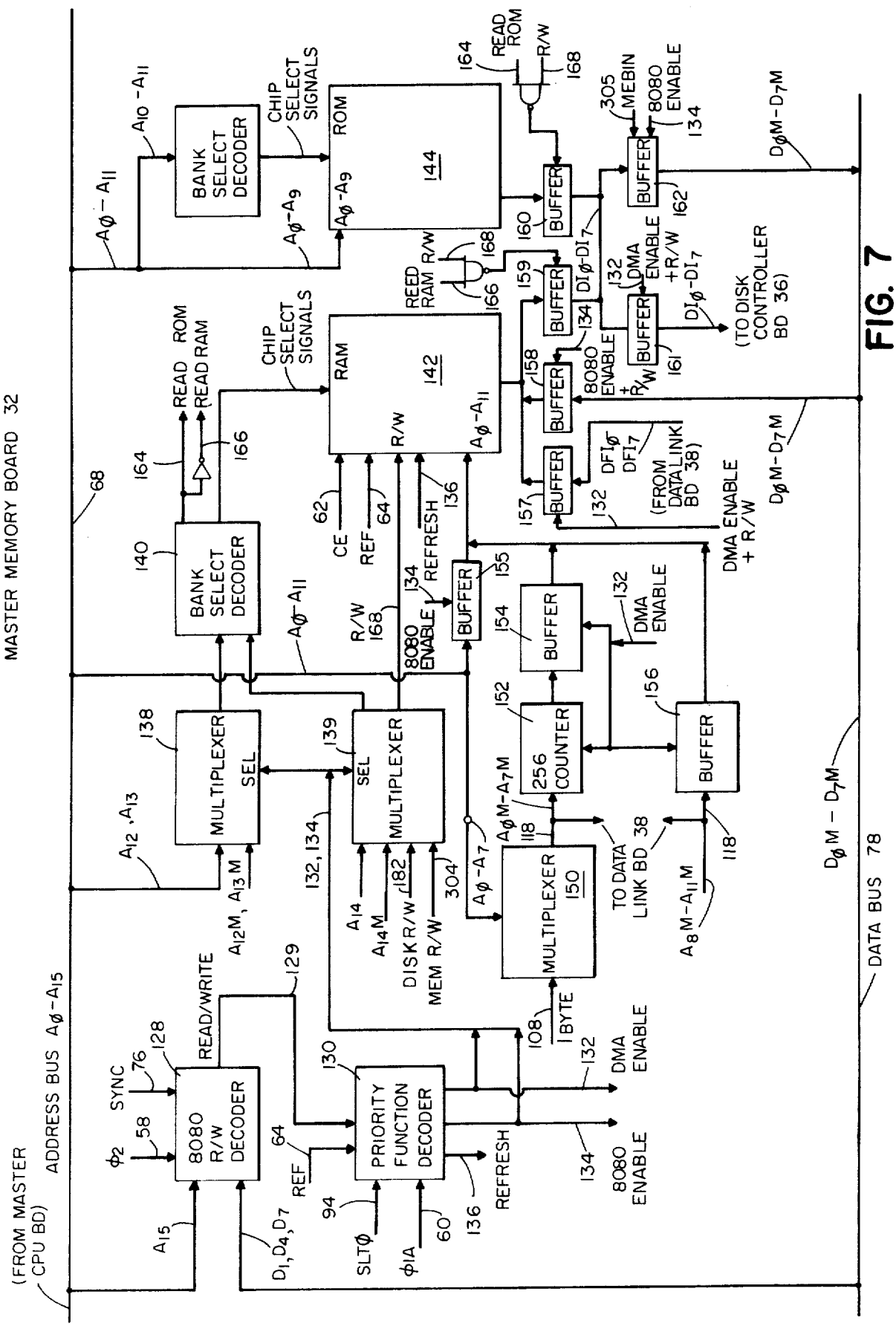
FIG. 7 is a detailed block diagram of the circuit elements of the master memory board.
Figure 8:
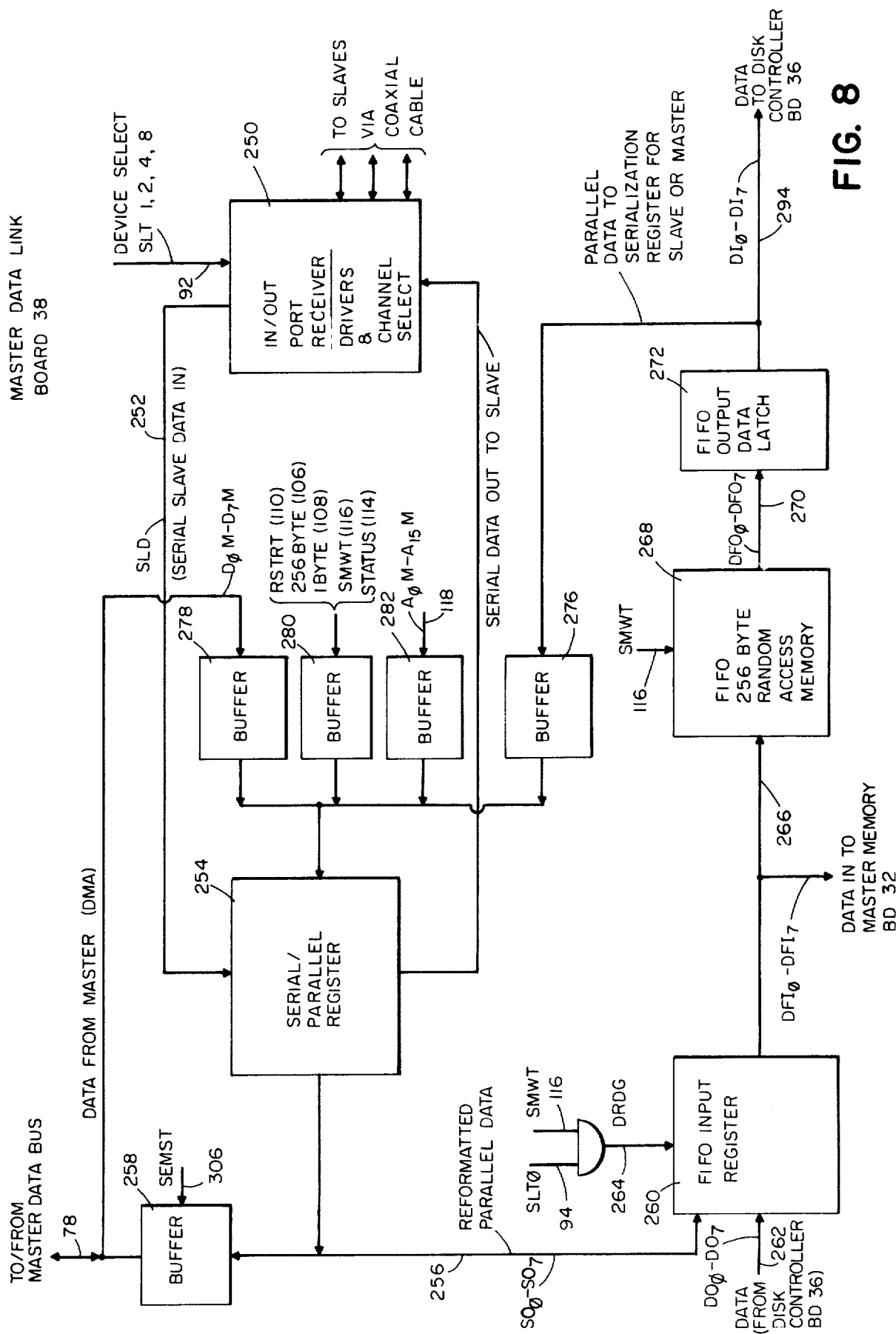
FIG. 8 is a detailed block diagram of the circuit elements of the master data link board.
Figure 9:
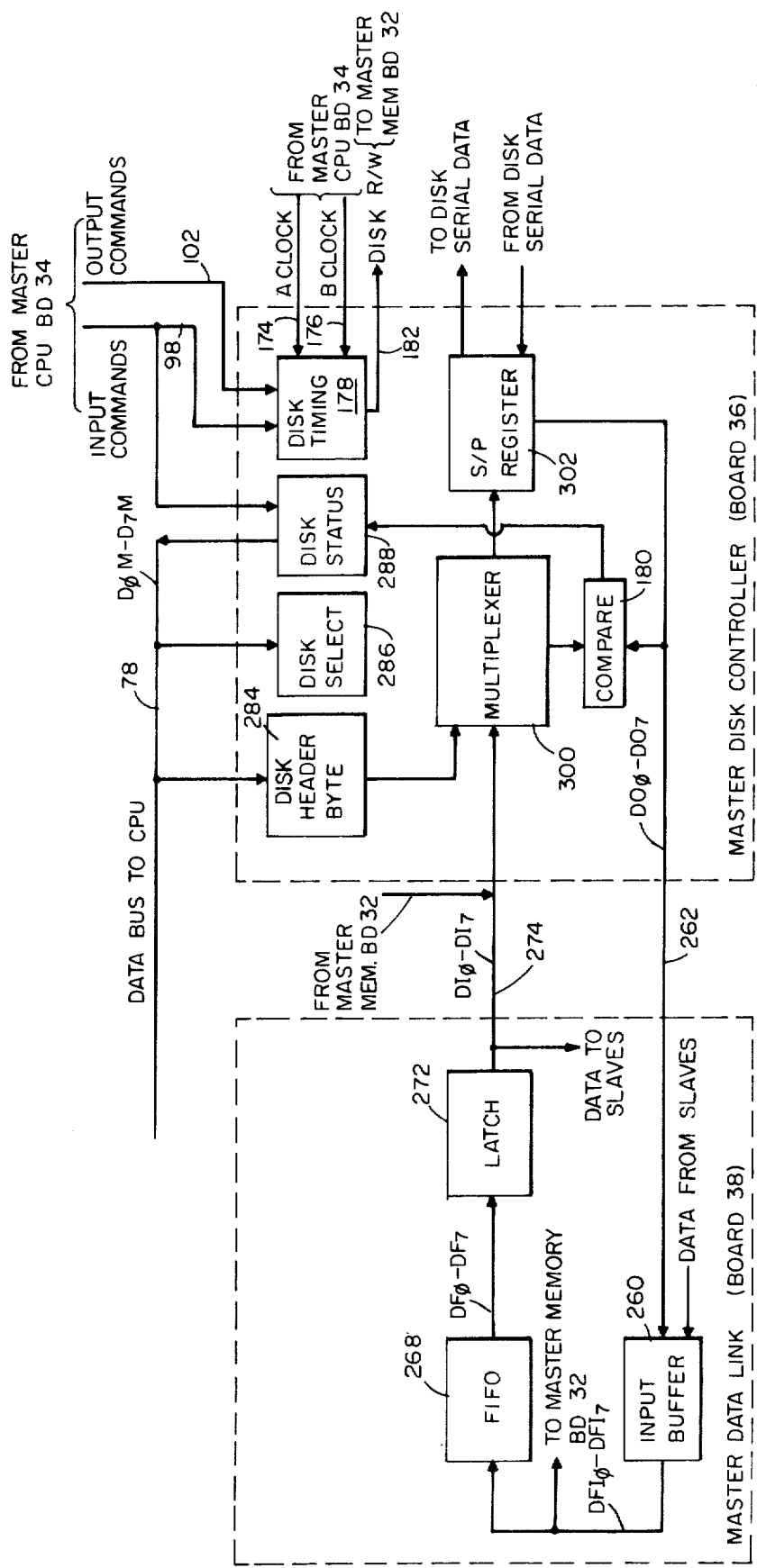
FIG. 9 is a simplified block diagram of the disk control board.
Figure 10:
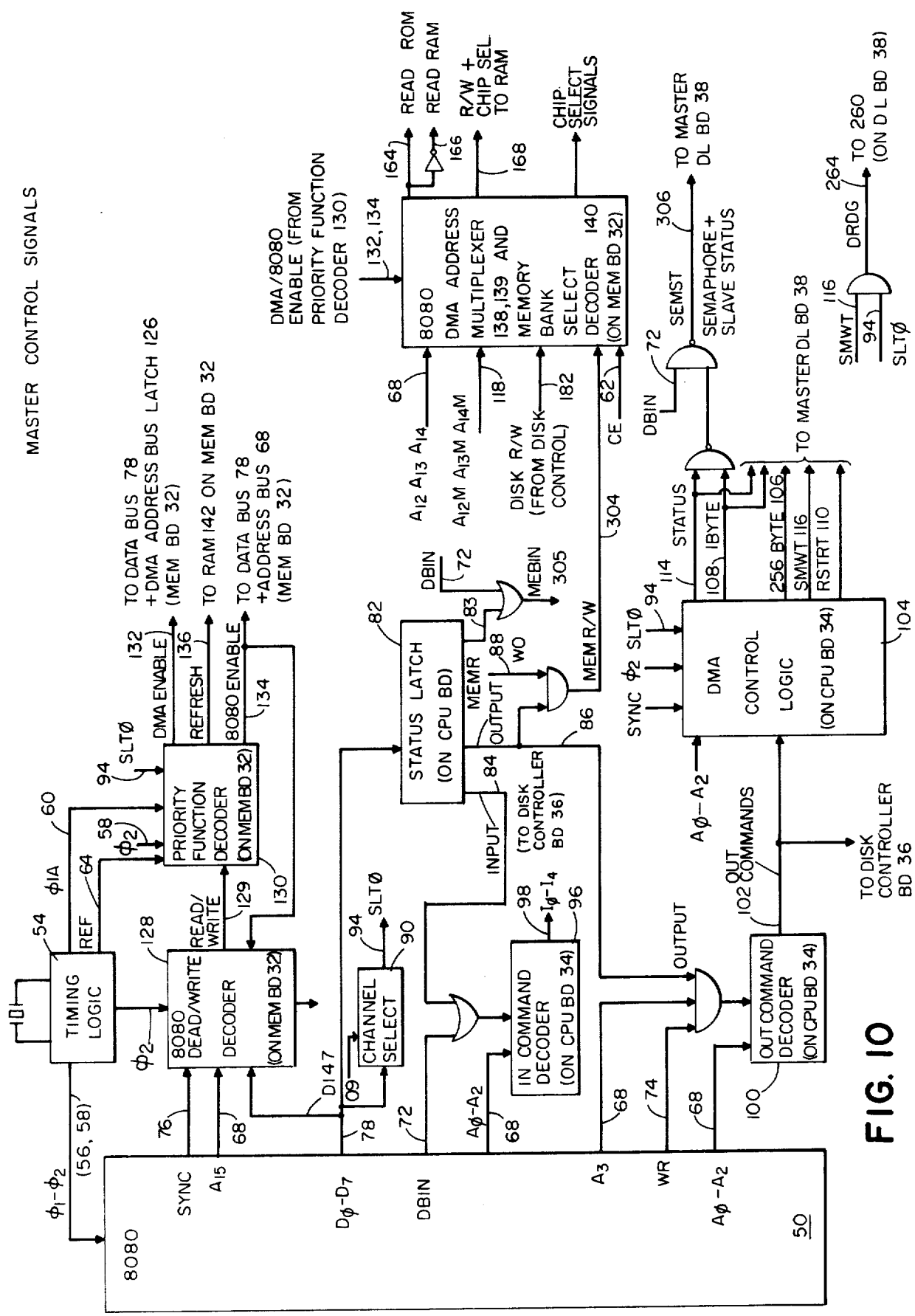
FIG. 10 shows the control signals of FIGS. 6 through 9.

The circuit boards comprising the Master Unit are shown in block diagram form in FIG. 6 (Master Central Processor board 34), FIG. 7 (Master Memory board 32), FIG. 8 (Master Data Link board 38), FIG. 9 (Master Disk Controller board 36) and FIG. 10 (Master control signals).

Two classes of operation are performed within the system - "8080" operations and "Direct Memory Access" ("DMA") operations. An "8080" read/write is a local operation; the master microprocessor reads/writes the master memory; the work station microprocessor reads/writes the work station memory; the printer microprocessor reads/writes the printer memory. All these are "8080" reads/writes, employing "8080" address and data buses, and under local control. A "DMA" read/write is under the control of the master microprocessor. The master can read/write the work station memory or printer memory (either a single byte or a 256-byte block); the master can also read/write the disk. Data can be transferred directly between the disk and master data bus, or it can be transferred between disk and slave memory in a two-part operation, in which a block of data is read from the disk into a buffer (FIFO) memory (on the Master Data Link board 38) and then is driven over the coaxial cable to the slave memory. Data is transferred block by block in this manner. Similarly, data is read blockwise from slave memory to FIFO memory and then to the disk, all under DMA control by the Master.

Master CPU Board 34 (FIG. 6)

In summary, the Master CPU board 34 (FIG. 6) provides Input and Output commands, used to control operation of the disks and to control communication with the slave devices. Further, this board provides the high order Direct Memory Access (DMA) address bits A8M - A15M to the Master Data Link board 38, and provides Channel Select signals for controlling the coaxial cable receiver/drivers. Finally, this board provides control signals for 8080 reads and writes within the Master unit.

More in detail, the "Intel (R) 8080" microprocessor 50 is located on Master CPU board 34 (FIG. 6). As explained in detail in the "Intel (R) 8080 Microcomputer Systems User's Manual (July 1975)", microprocessor 50 has a 16-bit address bus 68 (carrying address bits A0 - A15), and an 8-bit bidirectional data bus 78 (carrying data bits D0M - D7M). Buses 68 and 78 are connected to three-state buffers 70 and 80 respectively, which can isolate the inputs to the microprocessor during a direct memory access operation using the buses. In addition, the microprocessor provides several timing and control outputs, of which only the DBIN or Data Bus In output 72, the SYNC output 76, and the WR or Write/Read output 74 are represented here. Timing for the master microprocessor is provided by timing circuits 54, driven by a 17.10 MHz oscillator 52, in a manner more fully described in the Manual referred to above. The timing signals 01 (56), 01A (60), 02 (58), and CE (memory enable) (62), are seen in the timing diagram of FIG. 12. The signal REF (refresh) 64 is a timing signal for the conventional refresh of the RAM memory on Master Memory board 32 (FIG. 7).

As is seen in the timing diagram of FIG. 11, and as explained in the Manual, in each instruction cycle the microprocessor 50 first outputs a status word (D0-D7) over the data bus 78. The status word is stored in the status latch 82, where it is decoded to provide the status bits MEMR (83), INPUT (84), OUTPUT (86) and WO (88), which are employed together with the output control signals from microprocessor 50 to control operations of the master unit and of the system, as will be seen in more detail.

In particular, the status bit OUTPUT (86) is input together with the microprocessor control signal WR (74) to the Out Command Decoder 100, which decodes the three address bits A0, A1 and A2 to derive Output Commands O0 - OF, which are input to the Direct Memory Access Control Logic block 104 and to the Disk Controller board 36 (FIG. 9). The relevant Master Output Commands have the following significance:

| MASTER CPU OUTPUT COMMANDS | |
|---|---|
| O$\phi$ | Trap selected slave to location 00 in |

MASTER CPU OUTPUT COMMANDS

| | |
|---|---|
| | slave memory |
| O1 | Select disk drive |
| O5 | Step disk head forward |
| O6 | Step disk head backward |
| O7 | Send first header byte to Disk Controller from 8080 accumulator (using data bus) |
| O8 | Send second header byte to Disk Controller from 8080 accumulator (using data bus) |
| O9 | Select slave |
| OA | Set page (memory) address |
| OB | READ |
| OC | WRITE |
| OF | Clear the coaxial channel |

Of the Output Commands, O0, OB, OC and OF are input to the DMA Control Logic block 104, which decodes address bits A0 - A2 and A15 to generate control signals for read and write operations involving slave devices. The command O9 is input to Channel Select block 90. The Master microprocessor 50 issues four data bits D0 - D3 which are clocked in to Channel Select block 90 by O9 and decoded into the select signals. Select signal SLT0 (94) is used to select the Master during an operation involving disk access. Signals SLT1, SLT2, SLT4 and SLT8 are output to the Master Data Link board 38 (FIG. 8) where they are used to select the channels to the various peripheral (slave) devices.

The SLT0 signal (94) from Channel Select block 90 is input to the Direct Memory Access Control Logic block 104, together with the SYNC signal (76) from the microprocessor 50, the timing signal 02, the Output Commands 102 (O0, OB, OC, and OF) from Decoder 100 and the address bits A0, A1, A2 and A15 from address bus 68. Block 104 outputs the following direct memory access commands: SMWT (116) (slave memory read/write), STATUS (114) (input hardware status of slave), RSTRT (110) (restart), and 1BYTE and 256BYTE signals 108 and 106. These signals will be explained below.

The Output Commands O0 - OF are also input to the Disk Controller board 36 (FIG. 9), where they are used to control disk operations, as will be described below.

The INPUT status bit 84 from Status Latch 82 is input together with the microprocessor timing control signal DBIN 72 to the In Command Decoder block 96, which decodes the address bits A0, A1 and A2 to derive the Input Commands 98. The Input Commands are input to the Disk Controller board 36 (FIG. 9). The relevant Master Input Commands have the following significance:

MASTER CPU INPUT COMMANDS

| | |
|---|---|
| I0 | Input Disk Status |
| I1 | Input Disk Sector Counter |
| I3 | Load Head |
| I4 | Unload Head |

Direct Memory Access Address Select block 120 provides the high-order DMA address bits. All block transfers of data being at "page" boundaries in memory. A "page" has 256 bytes. Therefore, the transfers are to/from addresses of which the low order bits (A0 - A7) all are zero. The high order address bits A8 - A14 output by microprocessor 50 on address bus 78 are input into multiplexer 120 on Master CPU Board 34, while the low order address bits A0 - A7 are input into multiplexer 150 on Master Memory Board 32. Multiplexer 120 also receives inputs from Page Address Counter 124, which during a block transfer of data is loaded (from Data Bus 78) with the page count for the block of data to be transferred. Counter 124 is decremented as each 256-byte block is transferred, and the decremented count is used to generate successive high-order DMA addresses A8M - A15M. During this process, multiplexer 150 (FIG. 7) gates zero's onto the DMA address bus (since all block addresses are integral multiples of 256). During one-byte data transfers, the entire DMA address is taken from the address bus 68.

Master Control signals (FIG. 10)

FIG. 10 shows the derivation of many of the control signals of the master unit; these signals actually appear on the four circuit boards (FIGS. 6, 7, 8 and 9) of the Master unit, but are also shown in a single figure for convenience.

As described in more detail in connection with FIG. 6, Master microprocessor 50 is timed by timing logic 54. Timing control signals SYNC (76), DBIN (72), and WR (74) are also output by microprocessor 50. Data bits D1, D4 and D7 are decoded in Status Latch 82 to provide status bits INPUT (84), OUTPUT (86), MEMR (83) and WO (88).

Status bit OUTPUT 86 is combined with Status bit WOZ 88 to provide MEMR/W 304, which indicates a memory read/write operation as distinguished from a disk read/write operation; the latter is indicated by DISK R/W 182, which comes from Disk Controller board 36.

Status bit INPUT (84) together with control signal DBIN (72) are input to In Command Decoder block 96, which decodes address bits A0 - A2 to provide Input Commands 98, which are sent to Disk Controller board 36. Status bit OUTPUT (86) together with control signal WR (74) are input to Out Command Decoder block 100, which decodes address bits A0 - A2 to provide Output Commands 102. Output Commands are sent to Disk Controller board 36, and are also input to DMA Control Logic block 104 and to Channel Select block 90.

Channel Select block 90 provides signal SLT0, which selects the Master for a disk DMA operation. This signal (inverted) is input together with the Output Commands to DMA Control Logic block 104, which provides signals STATUS (114), 1BYTE (108), SMWT (116), 256 BYTE (106), and RSTRT (110), which are sent to the Master Data Link board 38 to be sent to slave devices.

Data bits D1, D4 and D7 (of the status word decoded in latch 82) are also decoded in 8080 Read/Write decoder 128 to provide an 8080 READ/WRITE signal 129, which is input (with SLT0 94 and REF 64) to Priority Function Decoder 130, which outputs three enable signals 132, 134 and 136 to determine access to the master memory.

Address multiplexer and Memory Bank Select block (138, 139, 140, shown as one block here) decodes high order address bits for either an 8080 memory operation or a DMA operation, and provides chip select signals, including signals 164 and 166 which enable output buffers from either the RAM 142 or ROM 144. Signal MEBIN (305) is used to read data out of memory onto the 8080 data bus; signal SEMST (306) is used on Data Link board 38 to read in (one-byte) slave devide hardware status or a (one-byte) slave semaphore or status byte read to the Master data bus 78.

Control signal 1BYTE (108) together with SMWT 116 (Slave Memory Read/Write) from block 104 determines a transfer (read or write) of a single byte of data between slave and master; in a read operation, the slave memory byte may contain its operating status ("available" or "not available") or a request semaphore. 256BYTE (106) together with SMWT 116 determines a block transfer (read or write) of 256 bytes of data between slave and master or between slave and disk.

|  | MASTER | SLAVE |
|---|---|---|
| RESTART COMMAND: | HEADER BYTE→ | [CLEARS DATA LINK] |

When a 1BYTE READ command is sent, a slave header byte is followed by two address bytes, and one byte of data is returned:

|  | MASTER |  | SLAVE |
|---|---|---|---|
| 1-BYTE READ COMMAND: | LOW ORDER Address BYTE (8 bits) A→ | HIGH ORDER ADDRESS BYTE (8 bits) A→ ←DATA (1 BYTE) | HEADER BYTE H→ |

RSTRT (110) is an instruction to the slave to restart an operation that has resulted in an error. STATUS (114) is a request to a slave to send its hardware status (NOT RUNNING, BAD PARITY, LINE ERROR - not the same as operating status which is read from the slave memory) together with its device identification to the master (this is a one byte transfer).

When commands are sent from master to slave, they must be transferred in eleven-bit bytes ("slave header bytes") as shown below:

A 1BYTE WRITE command is followed by a two-byte address and one byte of data, and nothing is returned.

When a 256BYTE WRITE or READ is sent, the slave header byte is followed by a high order address byte and a low order address byte whose bits are all zero (because block writes and reads all begin at addresses that are integral multiples of 256 - "page boundaries"), which is followed by 256 bytes of data for a WRITE. When the command is WRITE, nothing is

|  | HIGH ORDER BITS |  |  |  | LOW ORDER BITS |  |  |  |  |  |
|---|---|---|---|---|---|---|---|---|---|---|
| Bits | 1 | 2 | 3 | 4 | 5 | 6 | 7 | 8 | 9 | 10 | 11 |
|  | START | D7 | D6 | D5 | D4 | D3 | D2 | D1 | D0 | PARITY | STOP |
|  | 1 | 1 | 0 | 1 | X | X | X | X | X | 0 | 0 |
|  |  | SYNC BITS |  |  |  |  |  |  |  |  |  |

In an instruction (slave header byte), bits D7, D6, D5 are always "101", and are decoded in the slave to indicate that the byte is an instruction. Particular instructions (slave header bytes) are:

| D7 | D6 | D5 | D4 | D3 | D2 | D1 | D0 | PARITY |  | COMMAND |
|---|---|---|---|---|---|---|---|---|---|---|
| 1 | 0 | 1 | 1 | 0 | 0 | 0 | 0 | 1 | = | STATUS |
| 1 | 0 | 1 | 0 | 1 | 0 | 0 | 0 | 1 | = | RESTART |
| 1 | 0 | 1 | 0 | 0 | 1 | 0 | 0 | 1 | = | 256 BYTE READ FROM SLAVE |
| 1 | 0 | 1 | 0 | 0 | 1 | 0 | 1 | 0 | = | 256 BYTE WRITE TO SLAVE |
| 1 | 0 | 1 | 0 | 0 | 0 | 1 | 0 | 1 | = | 1 BYTE READ FROM SLAVE |
| 1 | 0 | 1 | 0 | 0 | 0 | 1 | 1 | 0 | = | 1 BYTE WRITE TO SLAVE |

When a STATUS command is sent from Master to Slave, only a single (slave header) byte is sent, and a single byte of data is returned from the slave, of which bits D0 - D3 are the hardware status and bits D4 - D7 are the (hardwired) device ID.

|  | MASTER | SLAVE (CRT OR PRINTER) |
|---|---|---|
| STATUS COMMAND: | HEADER BYTE → | ←STATUS BYTE |

When a RESTART command is sent, a single slave header byte is sent, and no data is returned from the slave:

returned; when the command is READ, the slave sends 256 bytes of data to the master.

Master Memory board 32 (FIG. 7)

In summary, board 32 (FIG. 7) provides the ROM (read-only memory) 144 and the RAM (random access memory) 142. The address bus 68 and data bus 78 from Master CPU board 34 are connected to Master Memory board 32. Data may be read from ROM 144 or RAM 142 via data bus 78 to Master microprocessor 50; data from RAM 142 may be sent to Data Link board 38 for transfer to a slave memory, or may be sent to Disk Controller board 36 to be written on a disk. Data may be written into RAM 142 from microprocessor 50 via data bus 78, or via Data Link board 38 from either a disk or a slave.

The Master read-only memory (ROM) 144 consists of four 1024 x 8 bit programmed read-only memory chips that are addressed by the address bits A0-A11. Address bits A10 and A11 are used to select one of the four chips. Bits A0 - A9 are used to address one of the 1024 locations on each chip. ROM 144 contains "bootstrap" programming which is executed when power is first turned on, and whose execution causes the Master unit to read operating programs from system disk 18 as will be described.

The RAM memory consists of four banks of 4096 x 1 bit chips. These are dynamic memory chips needing to be refreshed at least once every 2 milliseconds.

Address bit A15 (output by microprocessor 50) has a value of zero when Master Memory 142 or 144 is to be read, and has a value of one when a slave memory is to be read. This address bit is input to logic block 104, and also enables the 8080 Read/Write Decoder 128, which decodes the status word (data bits D1, D4, D7) to derive an 8080 READ/WRITE signal 129, input to the Priority Function Decoder 130.

The Priority Function Decoder 130 controls the time sharing of the access to the Master Memory. A Direct Memory Access operation has the highest priority, an 8080 read/write of the memory the second priority, and a Refresh operation the lowest. A DMA access ocurs generally as an interruption to ongoing 8080 operations. Timing signals (including REF 64) are input to decoder 130 together with SLT0 (94) and 8080 READ/WRITE 129.

The Priority Function Decoder block 130 outputs three signals, DMA ENABLE 132, 8080 ENABLE 134 and REFRESH 136. Signals 132 and 134 are input to multiplexers 138 and 139 to select either 8080 address bits or DMA address bits for use in selecting memory banks.

In addition, DMA ENABLE signal 132 enables buffer 132 to transmit data (DI0 - DI7) to Disk Controller board 36 in a Direct Memory Access operation, for output to the disk, and enables buffer 157 to transmit data (DFI0 - DFI7) from Data Link board 38 into RAM 142. The 8080 ENABLE signal 134 enables buffer 162 and buffer 158 during transfers of data between the microprocessor 50 and the Master Memory board 32. The REFRESH signal 136 is input to a Row Refresh Counter (not shown) which controls the refresh of RAM memory 142 in a conventional manner.

In an 8080 Read/Write operation, the 8080 ENABLE signal 134 gates low order address bits A0 - A11 from address bus 68 to RAM 142 to select memory locations. In a DMA Read/Write operation, low order bits A0 -A7 are gated through multiplexer 150 by the 1BYTE signal 108 during a one-byte transfer; DMA ENABLE 132 gates A0M - A7M together with A8M - A11M (from CPU board 34, as has been described) to the RAM. For a 256-byte transfer (from the disk), only zero's are gated onto the DMA address bus 118 from multiplexer 150, as has been described. Counter 152 provides bits A0M - A7M, which together with the high order address bytes for successive block transfers are input to the RAM. This frees the microprocessor for other activities, since it need not supply the address for every byte of a block transfer.

In a memory read operation (whether 8080 or DMA), data from ROM 144 is read into buffer 160 or data from RAM 142 is read into buffer 159. Select signals READ ROM (164) and READ RAM (166) together with R/W (168, from multiplexer 139) read out the selected memory data (as DI0 - DI7 ) into buffers 161 and 162. The data is gated out of buffer 162 to data bus 78 (as D0M - D7M) by signal MEBIN 305 (from FIG. 10). The data may go to the accumulator of the microprocessor 50 or to Data Link board 38 for transfer to a slave device. Alternatively, the data is gated from buffer 161 (as DI0 - DI7) by R/W 168, and goes to Disk Controller board 36 for writing to the disk.

In a Write operation, data from data bus 78 (D0M - D7M) is gated out of buffer 158 by R/W 168 high into RAM 142. Alternatively, data from Data Link board 38 (DFI0 - DFI7) is gated out of buffer 157 by R/W 168 low.

Master Data Link board 38 (FIG. 8)

The Master Data Link board 38 is the interface between the Master unit 16 and the system and archive disks 18 and 19 (by way of the FIFO memory 268) and between the Master unit 16 and the slave devices 10 and 12 (by way of the coaxial cables).

The Master Data Link board provides the coaxial cable receiver/drivers 250, which output or receive serial data over the coaxial cables to the slave units of the system (not to the disks). Device Select signals 92 (from Master CPU board 34, FIG. 6) select the appropriate channel for the transfer of data. Serial data (SLD) received from a slave device is input on bus 252 to the Serial/Parallel Register 254, where it is reformatted in parallel form. The parallel data may then be sent over bus 256 (as SO0 - SO7) either via buffer 258 to the master data bus 78, or to the FIFO ("first in, first out") memory 268.

The time required to read data from a disk or to write to the disk is much greater than the time required to send data over the coaxial cable. Access time for the disk is typically 3.2 microseconds/byte for a hard disk, 32 microseconds/byte for a floppy disk, whereas data is driven over the coaxial cable at a rate of 2.6 microseconds/byte. Consequently each block of data is read byte by byte from the Disk Controller board 36 (as DO0 - DO7) into the 256-byte FIFO memory 268, on Master Data Link board 38, and when a complete block is assembled, the data is read out of the FIFO memory to the serialization register 254 for transfer to the addressed slave device. However, data is read in from disk to Master memory without going through the FIFO memory.

Data (DO0 - DO7) is input from Disk Controller board 36 to FIFO Input Register 260. Data from the Serial/Parallel register 254 (SO0 - SO7) is also input into Register 260; the select gate signal DRDG is derived from SLT0 94 and SMWT 116. SLT0 determines a transfer of data between the disk and the Master; SMWT determines a read or write from a slave memory.

Data from FIFO Input Register 260 is available directly to Master Memory board 32 (as DFI0 - DFI7) and also goes to the FIFO memory 268. Data from the FIFO memory is output (as DFO0 - DFO7) to the FIFO Output Latch 272, from which data goes either to the Disk Controller board 36 or to the Serial/Parallel Register 254 (through buffer 276) to be serialized for transfer to a slave device.

Thus the FIFO memory is used for a transfer either from disk to slave, or from slave to disk. When data is read from a disk to a slave, it is input in parallel form to Input Register 260, accumulated in the FIFO memory until a block is assembled, then output through latch 262 to Serial/Parallel Register 254 and then out to the Receiver/driver block 250 to be driven at a higher rate over the coaxial cable. When data is sent from a slave to a disk, it is received by Receiver/driver block 250 in serial form, reformatted in Register 254 in parallel form, input to Register 260 and stored in FIFO memory 268 to be sent to the disk at a slower rate. Data from the disk can be read in to Master Memory board 32 without being stored in the FIFO memory. Data to be written to the disk from Master Memory board 32 is input directly to Disk Controller board 36 without storage in the FIFO memory (see FIG. 9). Data from the Master Memory for a slave is input to Data Link board 38 (as D0M - D7M) through buffer 278, serialized in Register 254, and driven over the coaxial cable to the selected slave. Data from a selected slave to the Master is received in serial form, reformatted in parallel form in Register 254, and output through buffer 258 to the data bus.

Instructions (slave header bytes), address bytes and data bytes of the type previously described are sent to the slave through the Data Link board 32. The header byte represents one of the instructions RESTRT, 256BYTE READ/WRITE, 1BYTE READ/WRITE, or STATUS, as shown above and is input through buffer 280. Address bytes, if required by the particular instruction, are input from the DMA address bus 118 through buffer 282. Data, if required, is input from DMA data bus 78 through buffer 278. The required bytes are sent serially from Register 254 to Receiver/Driver block 250, which drives the data over the selected coaxial cable to the selected slave.

Disk Controller board 36 (FIG. 9)

A disk clock 172, driven by a 10 MHZ oscillator 170, is provided on the Master CPU board 34 (FIG. 6), and outputs two clock signals, ACLOCK 174 and BCLOCK 176, for timing disk operations. These clock signals are input, together with Input Commands and Output Commands from the Master CPU board 34, to the Disk Timing block 178 of the Disk Controller board 36, which controls the disk operations in a conventional manner, and which also provides a signal DMA R/W (182), which is input to the Master Memory board 32 at multiplexer 139, to time the addressing of the memory during transfers between Master and disk.

Referring to FIG. 9, the Master CPU board data bus 78 provides data to Disk Header Byte block 284, indicating the sector and track on the disk that is to be addressed. Disk select data is input to Disk Select block 286 from the data bus 78, determining selection of the particular disk in a conventional manner not further described herein. Input Command I0 requests the hardware status of the disk controller. Disk Status block 288 outputs a disk status signal to the data bus 78. The disk header byte input through block 284 is compared to Compare block 180 with the disk header byte actually read, and if there is an error, an appropriate signal is output to the Disk Status block 288.

Data from the FIFO memory 268 is output through latch 272 on the Master Data Link board 38 for input to the Disk Controller Board serial/parallel register 302 through multiplexer 300, for eventual writing to the disk. Disk Header Byte block 284 receives data over the DMA data bus 78 from the Master Central Processor, and constructs appropriate disk header bytes for output to the disk, also through S/P register 302.

When the disk is read, serial data is input from the disk to S/P register 302, which outputs parallel data to Input Buffer 260 (on Data Link Board 38) from which it is input to the FIFO memory for eventual transfer to the requesting slave device. Header bytes from the disk are input to Compare block 180, as previously discussed.

Work Station unit 10

Figure 12:
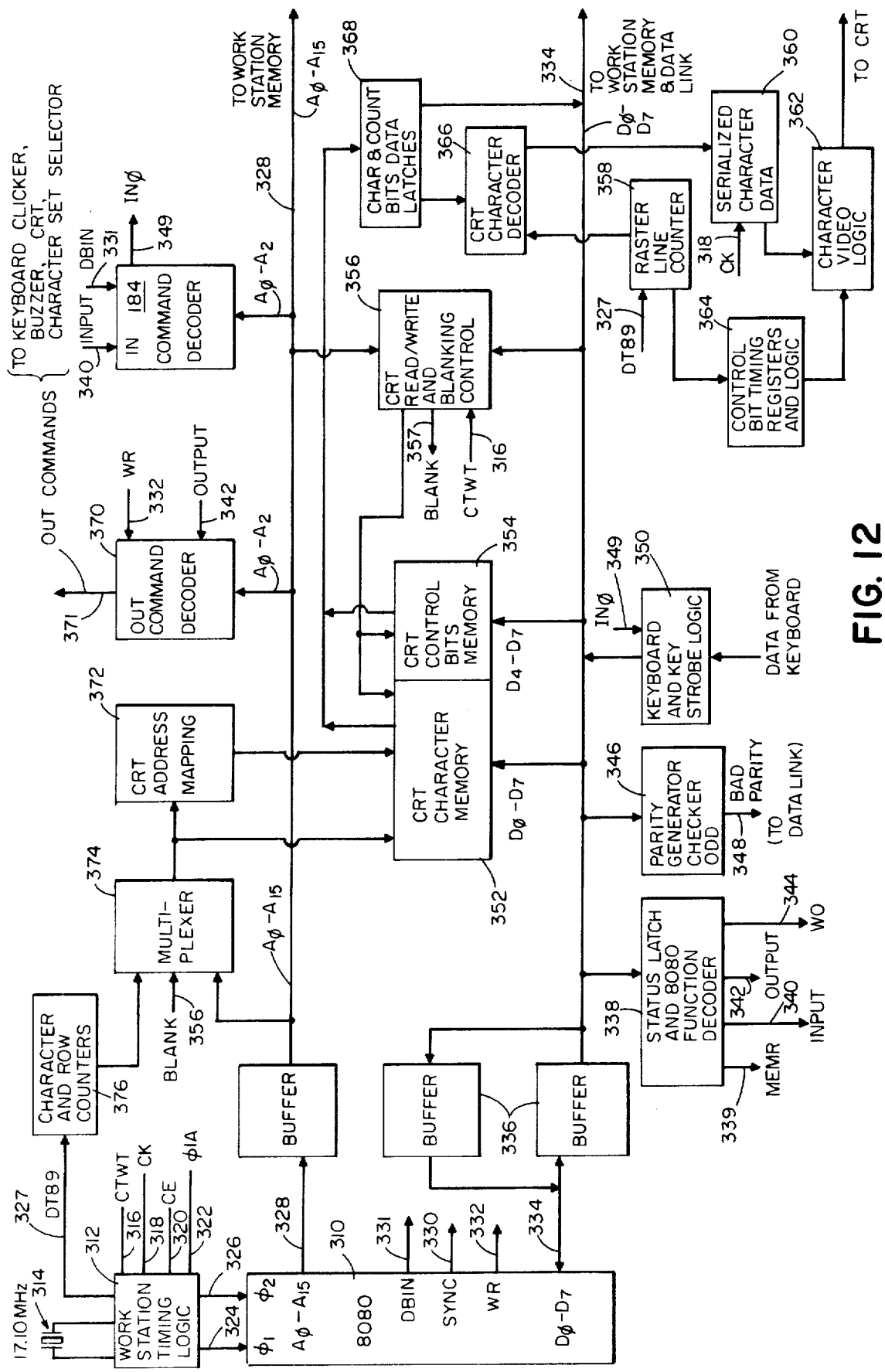
FIG. 12 is a detailed block diagram of the work station central processor board.
Figure 13:
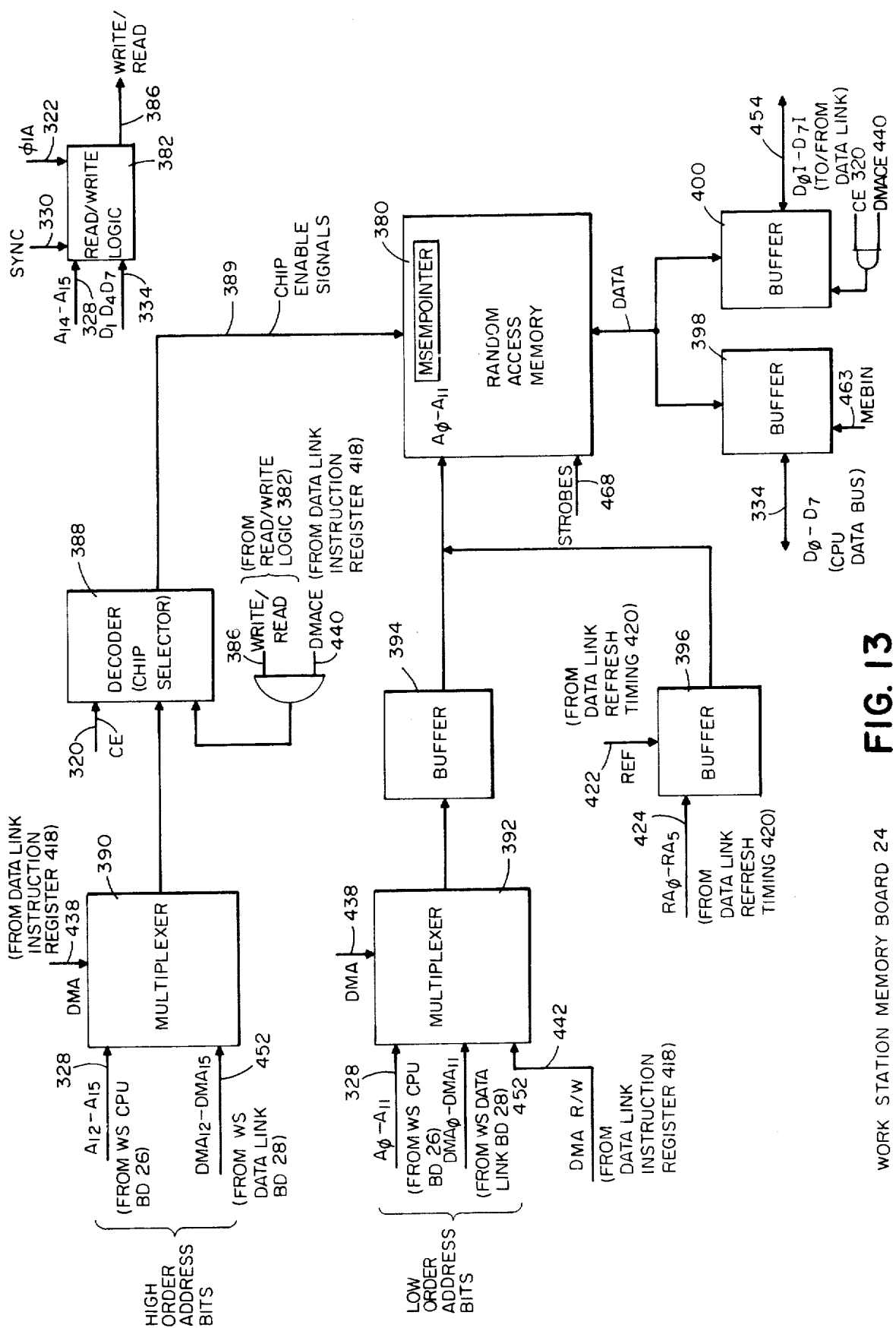
FIG. 13 is a detailed block diagram of the work station memory board.
Figure 14:
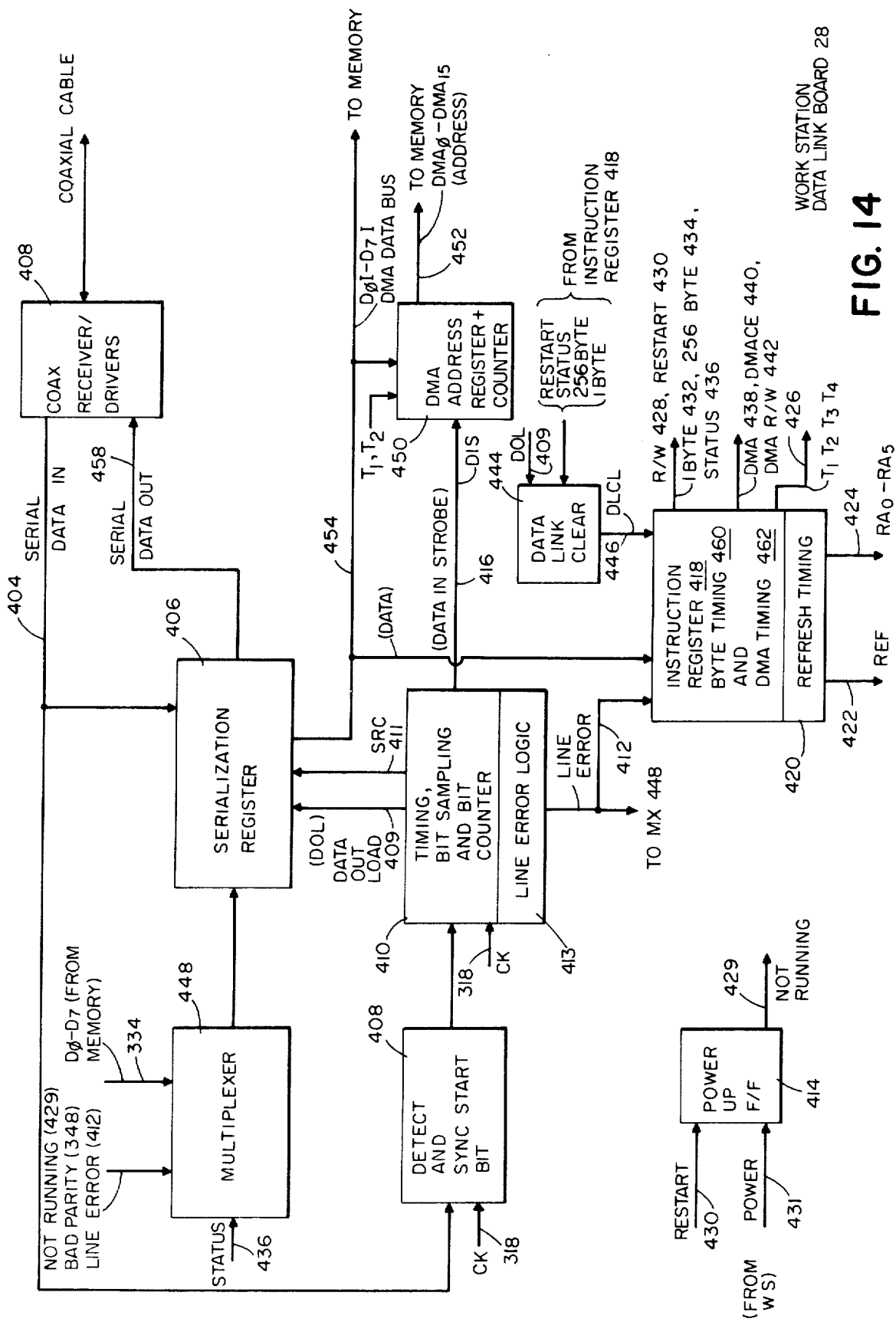
FIG. 14 is a detailed block diagram of the work station data link board.
Figure 15:
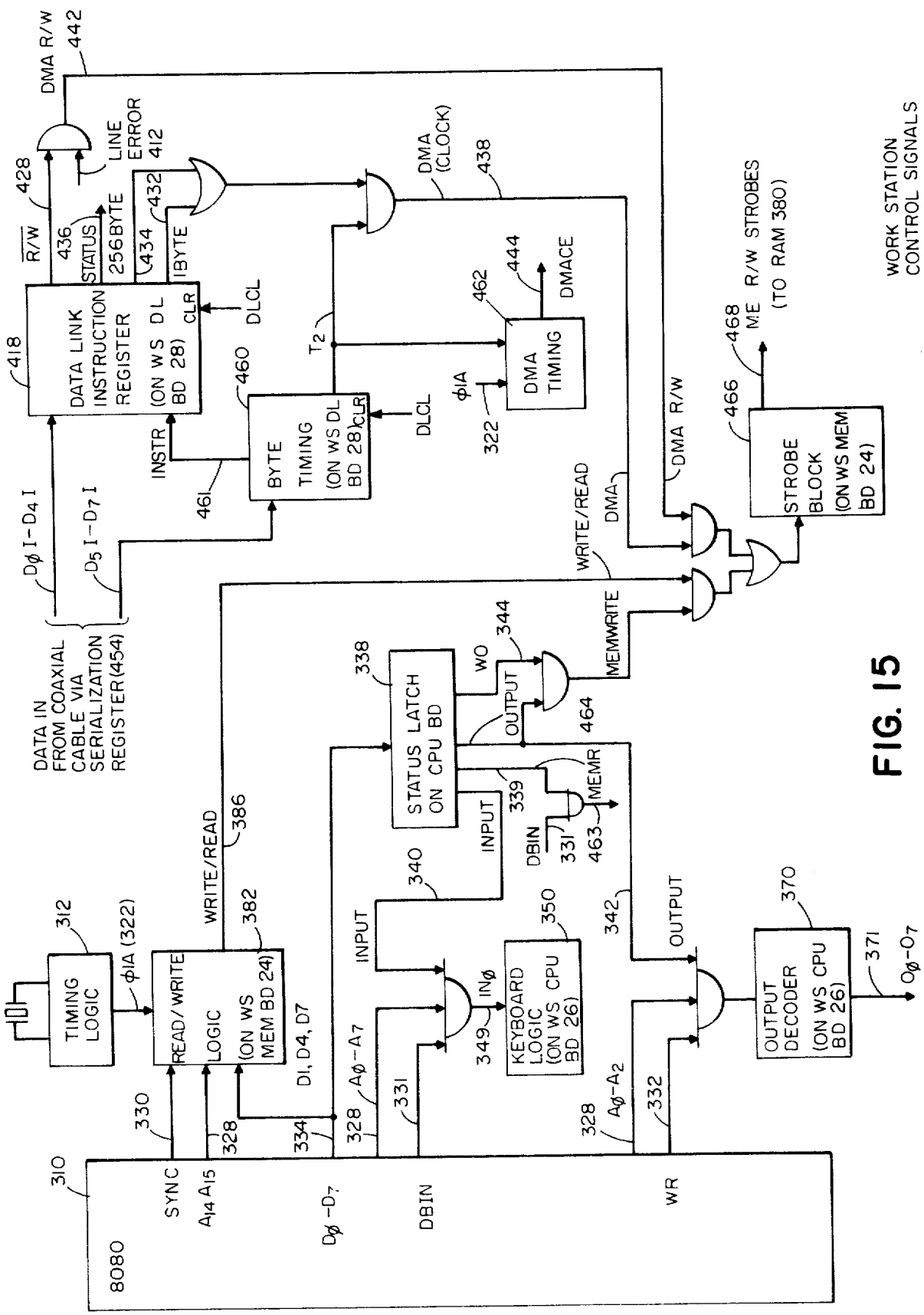
FIG. 15 shows the control signals of FIGS. 12 through 14.

The elements of the work station circuit boards are shown in block diagram form in FIG. 12 (Work Station CPU Board 26), FIG. 13 (Work Station Memory board 32), FIG. 14 (Work Station Data Link board 28) and FIG. 15, which shows the control signals of the three previous figures on a single sheet and in slightly greater detail.

Work Station Central Processor board 26 (FIG 12)

A microprocessor 310 is located on the Work Station CPU Board 26, and is similar to the microprocessor of the Master CPU Board 34. It has a 16-bit bidirectional address bus 328 and an 8-bit bidirectional data bus 334, and outputs timing control signals DBIN (data bus in) 331, SYNC 330 and WR 332. Microprocessor 310 is timed by timing signals 01 (324) and 02 (326) from timing logic 312, driven by the oscillator 314. Timing logic 312 also provides timing signals CK (clock) 318, CE (chip enable) 320, 01A 322, DT89 (for timing the CRT character and row counters) 327, and CTWT (CRT write clock) 316.

Work station CPU board 26 provides keyboard logic 350 for receiving and interpreting keystroke information. An Input Command IN0 (349), from In Command Decoder 184, activates this logic, which is of a conventional kind, to permit input of keyboard data onto the data bus 334.

A status latch 338, similar to latch 82 of the Master CPU board 34, decodes the status word output on bus 334 to derive the status bits MEMR (339), INPUT (340), OUTPUT (342) and WO (344).

Address bits A0-A2 on address bus 328 are decoded by Out Command Decoder 370, as controlled by Status bit OUTPUT (342) and microprocessor control signal WR (332), to derive the Output Commands 321. The relevant Output Commands have the following significance:

| WORK STATION CPU OUTPUT COMMANDS | |
|---|---|
| O0 | Sound clicker |
| O1 | Sound buzzer |
| O6 | Select CRT character set 1 (Dual ROM option) |
| O7 | Select CRT character set 2 (Dual ROM option) |

These commands control the keyboard clicker, the alarm buzzer, and the optional character set selector, none of which is shown here. The remaining logic on the Work Station CPU board 26 is largely directed to control of the CRT 14, and includes CRT address mapping block 372, CRT character memory 352, CRT control bits memory 354, CRT read/write and blanking control block 356, CRT character decoder 366, raster line counter 358, control bit timing registers and logic block 364, and character video logic block 362. These controls for the CRT are of a conventional nature and need not be further described.

Work Station Data Link board 28 (FIG. 14)

The Work Station Data Link board 28 provides the coaxial cable receiver/drivers 402. Serial data (from the Master unit) from the drivers 402 is carried on bus 404 to serialization register 406, where it is reformatted in parallel form (as D0I - D7I) for transmission on DMA data bus 454 to the work station memory. The serial data on bus 404 passes bit by bit through Detect and Sync Start Bit block 408 and Bit Sampling/Bit counter 410 when the start bit has been detected. Block 410 outputs SRC (Serial Register Clock) 411, which clocks serial data into Register 406. When eleven bits have been counted, indicating a complete byte received, block 410 outputs signal DOL (Data Out Load) which loads the byte out of Register 406, onto bus 454. If data bits D7, D6, D5, when decoded, indicate that the byte is an instruction, Byte Timing block 460 clocks the remaining bits D4 - D0 into Instruction Register 418, which decodes the instruction. Bit Counter 410 outputs DIS (Data In Strobe) 416, which clocks input data from bus 454 into DMA Address Register and Counter 450. For the instructions R/W, 1BYTE, and 256BYTE, the high order address byte is loaded out at T1, and the low order address byte at T2. The low order address byte is provided by the counter of 450, as described in connection with counter 152 (FIG. 7). For the RESTART and STATUS instructions, no address is required. Subsequent bytes are regarded as data; the output DMACE (444) from DMA Timing block 462 is input at time T3 to Work Station Memory board 24, to access the location whose DMA address has been input. For the 1BYTE WRITE instruction, only one byte of data is transmitted; for a 256BYTE WRITE instruction, alternating DMA addresses (2 bytes) and data (1 byte) are transferred.

STATUS is a request for the work station hardware status, and controls the multiplexer 448, which transmits either data from the Work Station data bus 334 (when the command is READ) or the hardware status NOT RUNNING (429) from the Power Up Flip/Flop 414, BAD PARITY (348) (from the CPU board 26), or LINE ERROR 412 from the Line Error Logic 413, together with hardwired device identification (when the command is STATUS). The device identification informs the Master what kind of slave is attached; this information is used by the Master in loading the Initial Program into slave memory, as will be described.

Status or data is input from multiplexer 448 to the Serialization Register 406 for output in serial form over the coaxial cable to the Master.

Refresh Timing block 420 outputs a REF signal 422 together with refresh address bits RA0-RA5, which are input to the Work Station Memory board 24.

Work Station Memory board 24 (FIG. 13)

The Work Station Memory board provides a 16 K Random Access Memory 380. The three high-order address bits of either the 8080 address (from microprocessor 310) or the DMA address (from Register 450) are input into multiplexer 390 and gated by the DMA timing signal 438. The selected address bits are decoded in Decoder 388 and provide the Chip Enable Signals 389 which select one of the four memory blanks of the RAM 380. The lower order address bits of either the 8080 memory address or the DMA address are used to address particular locations in each memory bank. The REF signal and address are used to refresh the memory. Data is output/input through buffer 398 to the data bus 334 and through buffer 400 to the Data Link board 28 on bus 454.

Work Station Control Signals (FIG. 15)

The control signals of the Work Station circuit boards are seen in FIG. 15. Memory read/write strobe signals 468 (input to RAM 380) are output from Strobe Block 366 in response to 8080 read/write commands from microprocessor 310 or DMA read/write commands from Data Link Instruction Register 418. DMA Timing block 462 is used to enable signal DMACE 444 for each byte of data written into memory. DMACE is the gating signal for accessory memory.

Printer Unit 22

Figure 17:
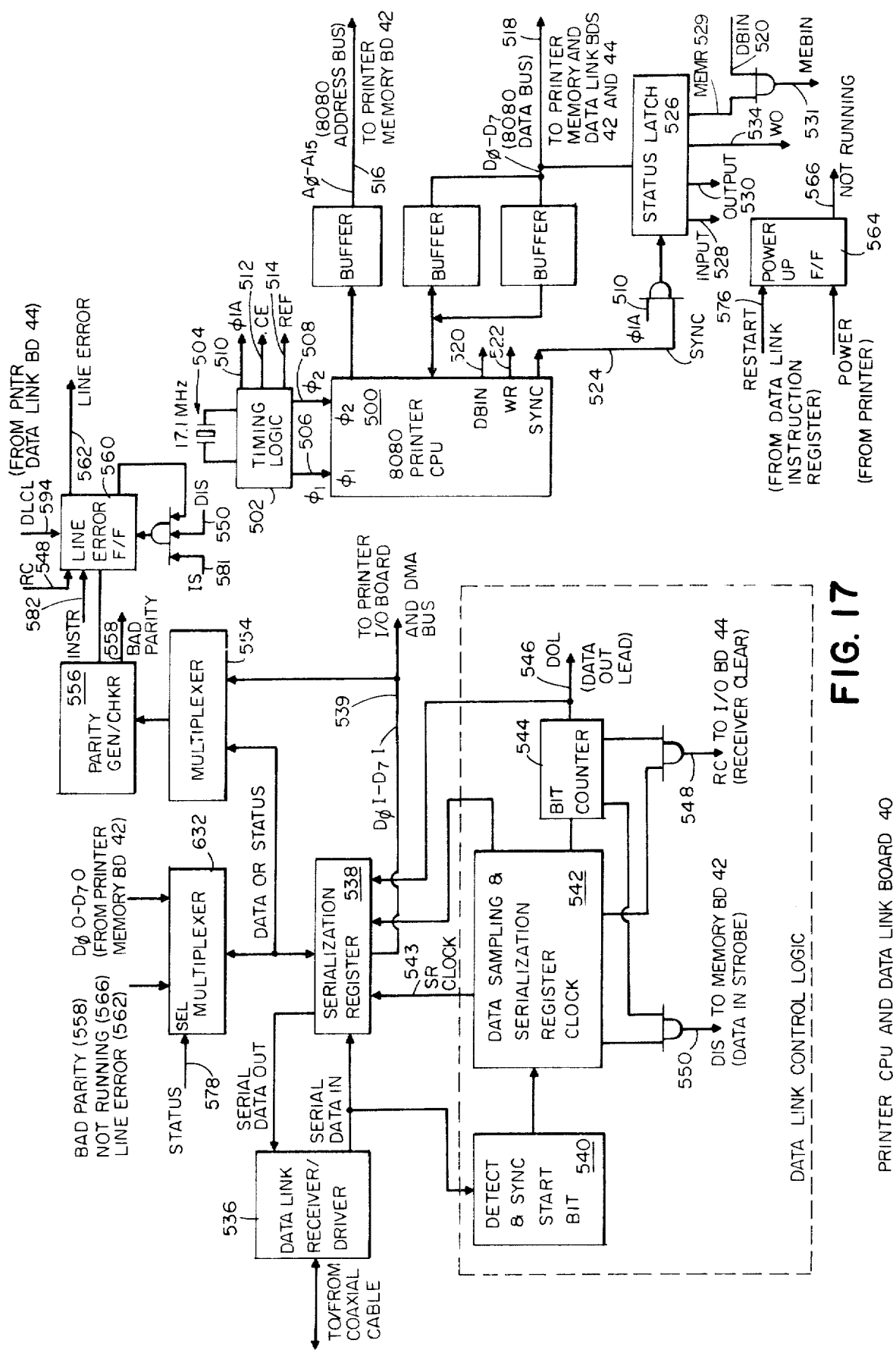
FIG. 17 is a detailed block diagram of the printer central processor and data link board.
Figure 18:
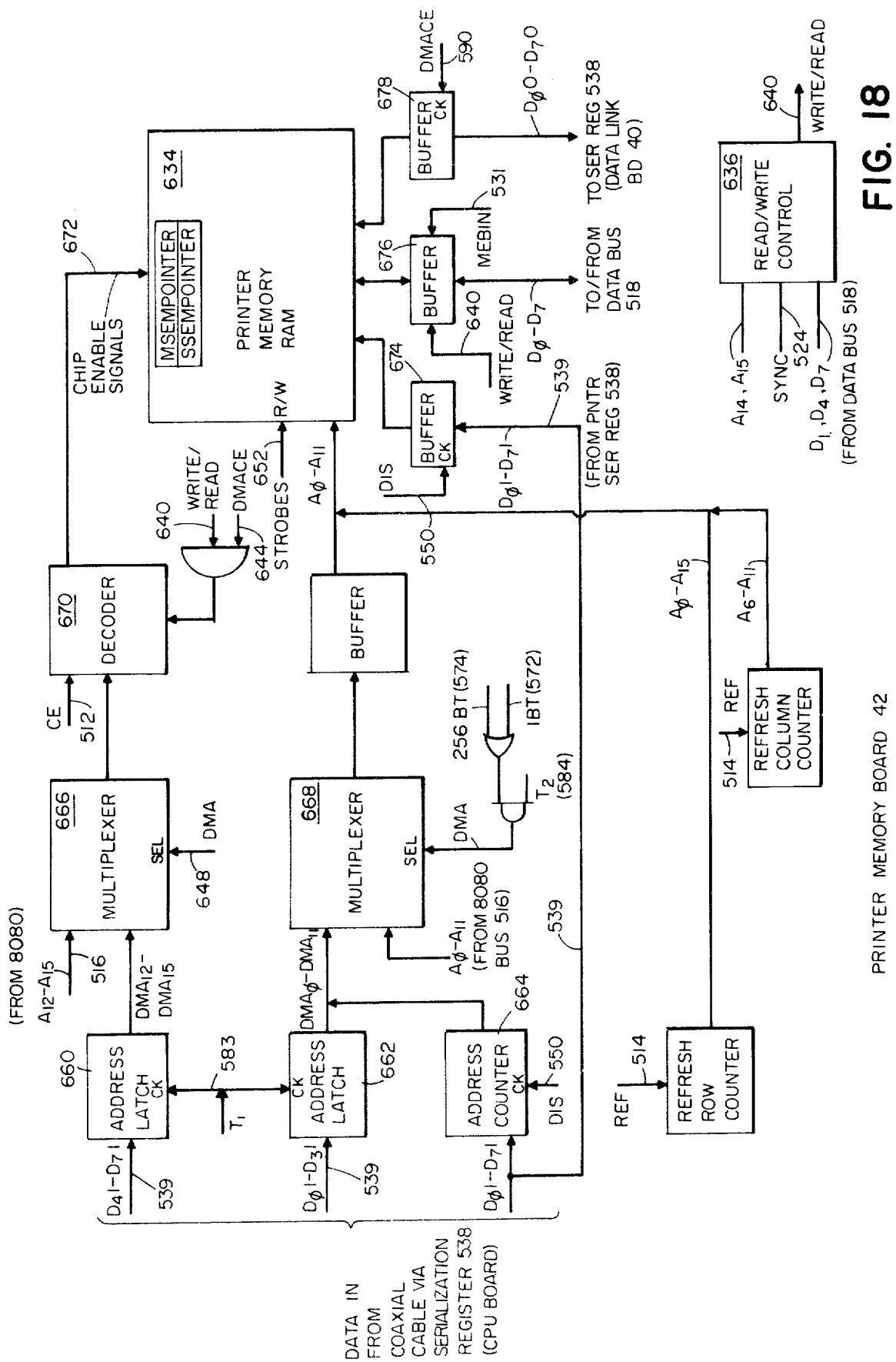
FIG. 18 is a detailed block diagram of the printer memory board.

The printer circuit boards are shown in block diagram form in FIG. 17 (Printer CPU and Data Link board 40), FIG. 18 (Printer Memory board 42), and 19 (Printer I/O board 44).

Printer CPU and Data Link board 40 (FIG 17)

An "Intel 8080" microprocessor 500 is provided on this board, similar to those described for the Master and Work Station units. Like them, microprocessor 500 is timed by its own Timing Logic 502, driven by oscillator 504 and providing timing signals 01 (506), 02 (508), 01A (510), CE (chip enable) (512), and REF (514). An 8-bit bidirectional data bus 518 and a 16-bit bidirectional address bus 516 are connected to microprocessor 500, which provides timing control outputs DBIN (520), SYNC (524) and WR (522). Status latch 526 decodes the status word and derives four status bits, INPUT (528), OUTPUT (530), WO (534), and MEMR (529).

The printer data link logic is provided on the same circuit board 40. This logic includes the coaxial cable Receiver/driver block 536, which receives serial data from the Master unit 16 and sends it to Serialization register 538. The serial data is also sent to Detect and Sync Start Bit block 540 and to Data Sampling and Serialization Register Clock block 542. Block 542 outputs SRC 543 (Serial Register Clock) which clocks the serial data in to Register 538. When eleven bits have been detected by bit counter 544, a DOL (Data Out Load) signal 546 loads parallel data out of Register 538 onto DMA data bus 539 as D0I - D7I. Blocks 542 and 544 also output DIS 550 (Data in Strobe), which clocks data from bus 539 into Address Counter 664 on Printer Memory board 42 (FIG. 18), and RC 548 (Receiver Clear), which is input to Printer I/O board 44 (FIG. 19).

Input (reformatted) data is also sent to Parity Generator/checker block 556 which sends an output to Line Error Flip/Flop 560, which outputs a hardware status bit LINE ERROR 562. Block 556 also outputs a hardware status bit BAD PARITY 558. These bits, together with NOT RUNNING 566 (from Power Up flip/flop 564, FIG. 17) are multiplexed with data (D00 - D70) from the Printer Memory at Multiplexer 632; the command STATUS, decoded in Instruction Register 568 (FIG. 19) selects the status bits for output to the Master together with the device ID. Data (including hardware status) for output to the Master is serialized in Register 538 and driven over the coaxial cable by Receiver/driver block 536.

Referring to FIG. 19, the input data (D0I - D7I) from Register 538 (FIG. 17) is input to Instruction Register 568. The high order bits D7, D6, D5 are decoded at header byte decoder 579 to provide the IS (Instruction Start) input 581 to Byte Timing block 580. Output INSTR (582) clocks the data bits D0I - D4I into Instruction Register 568 for decoding into commands R/W (570), 1BT (572), 256BT (574), RESTART (576) and STATUS (578).

Byte Timing block 580 outputs further timing signals T1 (583) and T2 (584), which are used to clock in address and data bits. T2 is also input to DMA Timing block 586, which generates DMACE 590 (gating signal for accessing memory in a DMA operation) and COMPLETED WRITE 588. Signal 588 clears the data link after each one-byte write or after each byte of a 256-byte write. The various commands are input together with timing pulses to Data Link Clear block 592, whose output DLCL (594) clears Instruction Register 568, Byte Timing block 580, and Line Error flip/flop 560 (CPU board 40).

Out Command Decoder 596 and In Command Decoder 600 decode the address bits on bus 516 from microprocessor 500 in a manner already described for the Master and Work Station to derive Input and Output Commands to control printer operations.

The Printer output and Input Commands have the following significance:

| PRINTER CPU OUTPUT COMMANDS | |
|---|---|
| O8 | Send low byte of data to the 8080 output ports |
| O9 | Send the high byte of data to the 8080 output ports |
| OA | Send the contents of the output ports to the printer. The accumulator of the 8080 designates what the data is for vertical, horizontal motion, or print information. |
| OB | Deselect the printer |
| OC | Sound alarm |
| OD | Ribbon control |
| OE | Lamp control |
| PRINTER CPU INPUT COMMANDS | |
| I2 | Deliver Status from the Printer |
| I3 | Deliver Control Information from the Printer |

These commands are shown in FIG. 19 as inputs to appropriate circuitry, which controls the printing of characters and other operation of the printer in a conventional manner. The external status (malfunction, carriage position, print wheel position, paper feed) is input by Input Command I2 from gate 630 to the data bus 518. The TOP OF FORM signal is generated by switch 620 on the printer chassis (FIG. 1) and gated by Command I3 to the data bus. The printer may be selected or deselected by switch 604 on the printer chassis. The printer microprocessor may deselect the printer by issuing Output Command OB.

Printer Memory board 42 (FIG. 18)

Figure 16:
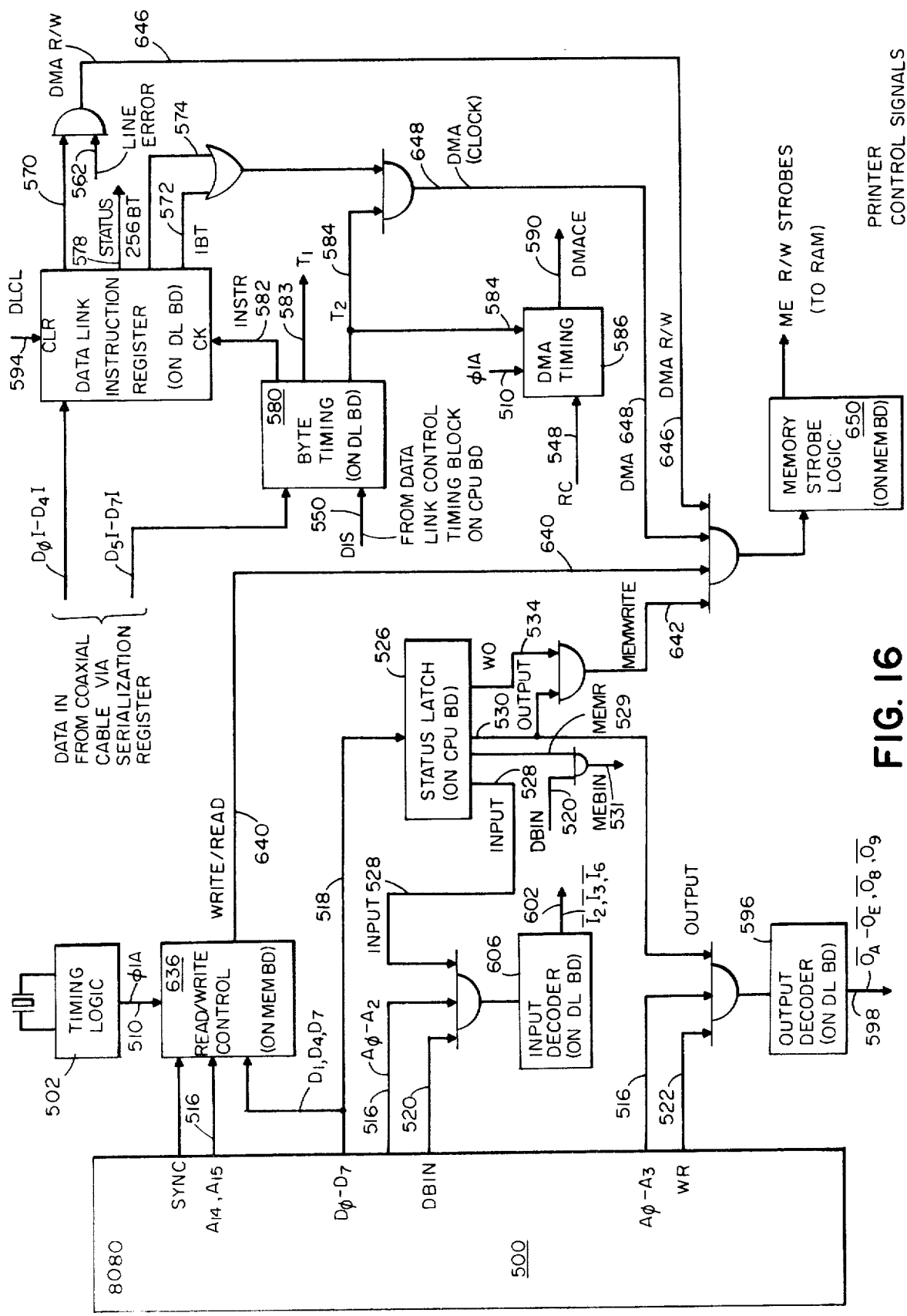
FIG. 16 shows the control signals of the printer circuit boards.

The DMA data bus 539 (D0I - D7I) is input to address latches 660 and 662 and to counter 664. (Counter 664 provides the low order address bits.) Data In Strobe (DIS 550) and Timing pulse T1 (583) input this data as DMA address bits. The high order bits DMA12 - DMA15 are multiplexed with A12 - A15 from microprocessor 500; the signal DMA (648, FIG. 16) selects the inputs. The high order address bits are decoded at Decoder 670 to provide chip enable signals 672 to select one of the banks of memory 634.

DMA and 8080 address bits DMA0 -DMA11 and A0 - A11 are multiplexed at multiplexer 668 and are input to the memory to select locations on the chips. During a DMA READ operation, data is read out of RAM 634 into buffer 678, gated by DMACE (590) onto the DMA data bus to the serialization register 538 in the Data Link logic (FIG. 17). During an 8080 READ, data is read out of RAM 634 into buffer 676 and gated by MEBIN 531 onto data bus 518. During an 8080 WRITE, data (D0 -D7) from data bus 518 is gated into buffer 676 by WRITE/READ 640 and written into RAM 634. Finally, during a DMA WRITE, data (D0 - D7I) is read from DMA data bus 539 into buffer 644 and is gated into memory by DIS 550.

The printer control signals of FIGS. 17 - 19 are seen in a single figure (FIG. 16), similar to the showings for the Master and work station units in FIGS. 10 and 15.

Disk read/write events

The Master microprocessor 50 (FIG. 6) outputs Output Command 01 ("Select disk") to Disk Controller board 36 (FIG. 9). Further commands from the master position the disk head, in a conventional manner not described here. Microprocessor 50 then outputs (via address bus 68) commands 07 and 08 to deliver first and second header bytes from the data bus (from the 8080 accumulator) to the Disk Controller board 36 (FIG. 9) via the Data Link board 38 (FIG. 8). This identifies the initial location of the read/write on the disk.

The microprocessor 50 then outputs command 09 ("select channel") on the address bus 68. The address of the selected device (master or slave) is output on the data bus 78, and decoded at block 90 (which is gated by signal 09) to provide the channel select signals.

The microprocessor 50 outputs the command OA on the address bus 68 ("load page address") and the number of "pages" (blocks) to be transferred on the data bus 78. The number of pages is loaded by OA into Page counter 124 (FIG. 6). The initial page address is output on the address bus 68. Multiplexer 120 (FIG. 6) outputs the page addresses (bits A8M - A15M)for contiguous pages; counter 124 is decremented by SLT0 (for reads to Master) or 256BYTE (for reads to slave).

The microprocessor 50 outputs command OB (READ) on the address bus 68. This goes to the Disk Controller board 36. A 256-byte block of data is read in from the selected part of the disk, as specified by the header bytes. It is input in parallel form from serialization register 302 on Disk Controller board 36 to FIFO Input Buffer 260 (FIG. 8) and appears as DFI0 - 7.

If read is to Master: SLT0 is input to Priority Function Decoder 130 (FIG. 7), which provides the signal DMA ENABLE 132. This enables buffer 157 into the Master RAM 142 (FIG. 7), and also enables 256-counter 152 to provide low-order address bits to the RAM. The signal DISKR/W 182 from the Disk Controller Board 36 clocks data into buffer 157 to be read into the RAM at the DMA address; it also selects address inputs at multiplexer 139 for chip select. R/W 168 gates data from buffer 157 into RAM 142. Data is input byte by byte. The signal DISKR/W 182 indicates when another byte is available.

If read is to Slave: SLT X (X = 1, 2, 4, 8) is the channel select signal 92 from block 90 (FIG. 6). SMWT (WRITE) 116 and 256BYTE 106 are the commands from logic 104 (FIG. 6). When data is read in from the disk, SMWT 116 gates it into the FIFO memory 268 (FIG. 8) (timed by FIFO clocks, not shown). Buffer 157 is not enabled (no DMA ENABLE signal); hence data does not go to Master Memory board 32. Data goes from FIFO output latch 272 (FIG. 8), to buffer 276, to serialization register 254, to drivers selected by SLT X. Data is sent over the coaxial cable 21 to the slave, preceded by a header byte composed of SMWT and 256BYTE, and by the DMA address. The DMA address is provided as described above for the read to Master.

Writes are accomplished in same way, except the Master must send a 256BYTE READ instruction to the slave, followed by a DMA address. The Slave returns a 256-byte block of data, which is written on to the disk at a location specified by header bytes supplied by the Master microprocessor.

Memory read/write events

One-byte read by Master. The Master microprocessor 50 outputs address bits that are decoded at logic block 104 to provide SMWT and 1BYTE commands to the slave. The channel is selected at blcok 90 as before. The high-order DMA address is selected from the address bus by the 1BYTE command at multiplexer 120 and provided to the DMA address bus 118.

The 1BYTE READ command is formulated as a header byte on the Master Data Link board 38, and is sent to the slave through buffer 280 and serial/parallel register 254; the header byte is followed by one byte of high order DMA address, and one byte of low order DMA address (from multiplexer 150, selected by the 1BYTE command).

The slave returns one byte of serial data, which is reformatted as parallel data in register 254. The byte that has been read is either a status byte read or a semaphore, hence the signal SEMST 306 (see FIG. 10) gates the byte through buffer 258 onto the master data bus 78. The master may either read the byte into its RAM (putting out an 8080 address, an 8080 ENABLE and a R/W for this purpose) or may use the byte in its accumulator.

One-byte instruction. The Master may send the slave the one-byte instruction STATUS 114, followed by no address. The Slave returns the hardware status and a hard-wired device indentification (SEMST 306 gates buffer 258). The Master may send the one-byte instruction RSTART 110 in case of a data link error, followed by no address; the slave returns nothing to the master.

Communication and semaphores

Access to the coaxial cables for disk reads and writes and direct memory access reads and writes is under control of the Master unit 16. Requests by slave devices for such access are signaled to the Master unit "semaphores", hich are specific areas in slave memory that may contain particular values indicating requests for particular services. Such semaphores are set by the slave, and are read by the Master by means of the one-byte transfers that have been described. The requested services are provided by the Master, after which the Master resets the semaphore value to a quantity indicating that the requested service has been completed. In addition to disk access, slave devices may request services of other slaves; these requests are relayed by the Master.

In the system of the invention, most instructions required by the slave work stations during operation are not hard-wired into their memories, but are provided on the system disk. The disk is easily replaced, which means that the particular operating features of the system are easily updated in part or replaced by other operations, providing a flexible and versatile system. In addition, the memory capacity required for each slave is reduced. The "bootstrap" programming, executed when the data processing system of the invention is first turned on, is hardwired, and is provided in the Master ROM 144 (FIG. 7). When the system is turned on at switch 11 Execution of this program causes the Master to poll each slave device by a STATUS command in order to identify its nature; the Master then reads into each slave memory a 256-byte "Initial Program" appropriate for the slave. This "Initial Program" is substantially the same for all slaves, with minor variations according to their natures. In addition, the Master loads its own RAM with operating instructions from the system disk.

When the Initial Program has been loaded successfully into all slave memories, the Master issues Output Command O0. This command is input to DMA Control logic block 104 (FIG. 6) and results in sending a command RSTART 110 to each slave in turn. This traps the slave to location 00 in its own memory, and the slave then executes its first 256 bytes of stored instructions. The program in the initial 256 bytes includes a routine to set a semaphore request to the Master to load further instructions into slave memory from the disk, in the manner described previously for block transfers.

No further requests to the Master are made by the work station 10 until a task is assigned to it. This may be, for example, a request by the operator to input new data or to edit data already recorded. The operator makes this request by depressing appropriate keys on keyboard 12. The work station microprocessor 30 (FIG. 12) interprets the input keystrokes and requests the Master to read into the work station RAM 380 (FIG. 13) the appropriate routines, stored on system disk 18, to execute the instruction. The request to the Master is made by setting the request semaphore in the slave memory to the appropriate value. In executing its own operating instructions, the master periodically reads the semaphore by one or more one-byte reads of slave memory, as has been described. The Master then transfers the requested data from the disk by the necessary number of 256-byte block transfers to slave memory (writing over any previously transferred data), and then resets the semaphore to a value indicating that the request has been completed. The slave can make no further request while the semaphore is not reset.

More in detail, each slave device memory provides a two-byte location, called the MSEMPOINTER, which is always the same, specifically, bytes 4 and 5. The content of this location is variable, and is the address of the communication area in slave memory. (This address is made variable for convenience in programming.) The communication area comprises up to ten bytes, of which the first is the "MSEM" or slave-to-master request semaphore. The remainder of the communication area provides parameters for the requested service; specifically, when a READ is requested, for example, the requesting slave central processor provides the disk address at which the data is stored, the address in its own memory to which the requested information should be transferred, and the number of blocks to be transferred. This information is input to the Master microprocessor, which then outputs the disk address as disk header bytes on its data bus, the initial memory address as the DMA address on its address bus, and the block count to the Page Counter block 124 (FIG. 6), as described above. Other parameters may also be provided for other types of requests by the slave.

The list of slave-to-master request semaphore values follows:

| MSEM | Function |
|---|---|
| O1 | Get Space |
| O2 | Release Space |
| O3 | Open New |
| O4 | Open OLD/EXCLUSIVE |
| O5 | Open OLD/SHARED |
| O6 | CLOSE |
| O7 | Uncatalog |
| O8 | Close System |

-continued

| MSEM | Function |
|------|----------|
| 09 | Catalog |
| 0A | Available Space |
| 0B | Print Purge |
| 0C | Print Request |
| 10 | Attach Archive |
| 11 | Release Archive |
| 12 | Set Time |
| 13 | Get Time |
| 80 | READ |
| 81 | WRITE |
| 83 | FORMAT |

(The semaphore value is given as two hexidecimal digits, each digit repesenting a 4-bit binary digit.)

"Get space" is a request to acquire free sectors on the disk for storage of data. "Release space" releases sectors on the disk, and places the sectors on the master's list of available sectors. "Open new" is a request for a free document identification number to identify the data to be input by an operator. The master unit provides a document number to the slave, enters the number in its internal catalog, and returns the disk address for the first corresponding sector to the slave. "Open old/exclusive" allows a slave access to a previously recorded document, exclusively. Such documents include the "print queue", or list of print tasks to be done. The master notes in its own memory that the document is in exclusive use by the particular slave. "Open old/shared" is similar to the previous request except that the document may be used by another slave at the same time. "Close" is used when the slave is finished with a document. The document is marked as available.

"Catalog" and "Uncatalog" are used to request the Master to place the document identification number into the catalog or to remove the number from the catalog. "CLose system" shuts down the entire system. "Read" is a request for a read from the disk. The slave provides the address of the first sector to be read, and the number of contiguous sectors to be read, as well as the page of origin or first memory address to which the data is to be written, as previously explained. "Write" is similar to "Read".

"Format track" directs a disk operation, not relevant to the present description of the system. "Attach archive" is a command that must precede any use of the archive disk 19 by a slave device. "Release archive" is output by the slave when it has finished using the archive disk.

"Available space" requests information as to the amount of free space left on the disk. "Get time" and "set time" are requests relating to record-keeping functions of the system, not further described herein. "Print request" and "print purge" are requests from work stations to print documents or to cancel print requests, and are relayed by the Master unit to appropriate printer devices.

In addition to the slave-to-master requests, there are two possible master-to-slave requests, addressed to the printer device only. (These are the relayed requests from a work station device.) The fixed area in printer RAM 634 called SSEMPOINTER (bytes 6 and 7) contains a variable address of the master-to-slave one-byte semaphore SSEM. Additional bytes contain relevant parameters. The two possible master-to-slave requests are "Start printer" and "Cancel output." The master may only make a request when the value of SSEM is zero. The master sets the SSEM to the appropriate value, by a DMA 1BYTE WRITE, and the slave (printer) microprocessor periodically reads the SSEM by an 8080 Memory Read. When the request SSEM is found to be non-zero, the slave processes the request.

The printer responds to a print request (comprising the SSEM together with parameters giving the disk location of data to be printed) by setting up a value of its own MSEM that requests a disk read. The master then writes the data from the disk to the printer memory, and the printer CPU controls the printing of the data. When the print task has been completed, the SSEM is reset by the slave (by an 8080 Memory Write) to zero. This value can then be read by the Master, by a DMA 1BYTE READ.

In the absence of a work station print request (resulting in the master's sending a "start printer" request to the printer) the printer CPU, executing its own stored program, periodically sets up a value of MSEM that requests to read the "print queue" on the disk. The printer scans the queue in search of a print task, and if one is found, the printer sets its operating status to "not available" and requests to read from the disk the document to be printed.

We claim:

1. A distributed data-processing system for processing informational data, comprising
 a resource memory having
  read-only memory for storing operational instruction data for said system, and
  on-line storage for storing said informational data,
 a master device having a master central processor, a master memory, a master data link, and a resource control unit, and master internal buses interconnecting said master central processor, master memory, master data link and resource control unit, and initiating means,
 at least one slave device having
  elements including a slave central processor, a slave memory, a slave data link,
  slave internal buses interconnecting said slave central processor, slave memory and slave data link,
  input and output means for inputting and outputting said informational data,
 said slave memory including a dedicated semaphore area, said slave central processor having means to set said semaphore area content to a particular value indicating a request for access to said resource memory,
 a data link data-carrying line connecting each said slave data link to said master data link,
 a resource memory data-carrying line connecting said master resource control unit to said resource memory,
 said master central processor having access means directly to read or write each said slave memory via said external data-carrying line and said slave internal buses independent of said slave central processor,
 said master central processor being responsive to said initiating means periodically directly to read said semaphore area,
 said master device being responsive to said particular value of said semaphore area content directly to transfer data between said resource memory and said slave memory via said resource memory date-carrying line, said data link data-carrying line and said slave internal buses independent of said slave central processor.

2. A distributed data-processing system for processing informational data, comprising
a resource memory having
read-only memory for storing operational instruction data for said system, and
on-line storage for storing said informational data,
a master device having a master central processor, a master memory, a master data link, a resource control unit, master internal buses interconnecting said master central processor, master memory, master data link, and resource control unit, and initiating means,
first and second slave devices each having elements including
a slave central processor, a slave memory, a slave data link, and
slave internal buses interconnecting the said elements of a said slave device,
each said slave memory providing a first dedicated semaphore area, each said slave central processor having means to set said first semaphore area content of that said slave device to a resource request value indicating a request for access to said resource memory,
an external data-carrying line connecting each said slave data link to said master data link,
a resource memory data-carrying line connecting said master resource control unit to said resource memory,
said master central processor having access means directly to read or write each said slave memory via said external data-carrying line and said slave internal buses independent of said slave central processor,
said master central processor being responsive to said initiating means periodically directly to read said first semaphore area of each said slave memory,
said master being responsive to said source request value of a said first semaphore area content directly to transfer data between said resource memory and the said slave memory of the requesting slave device via said resource memory data-carrying line, said external data-carrying line and said slave internal buses independent of said slave central processor.

3. The system of claim 2,
said first slave device further providing keyboard input means for inputting said informational data and for inputting a print command to print particular informational data stored in said resource memory,
said second slave device further providing print output means for printing said stored informational data, said second slave device memory having a second dedicated semaphore area, said second slave device central processor being responsive to said initiating means periodically to read said second semaphore area,
said first slave device central processor being responsive to said input print command to set its said first semaphore area content to a print request value,
said master being responsive to said print request value of said first slave device first semaphore area content to set said second slave device second semaphore area content to a print request value,
said second slave device central processor being responsive to said second semaphore area content print request value in its own said slave memory to set its said first semaphore area content to a resource request value for accessing said stored particular informational data to be printed.

4. The system of claim 2,
said master internal buses and said slave internal buses being adapted to carry data in parallel form,
said external data-carrying lines being adapted to carry data in serial form,
said master data link and each said slave data link including means to reformat data from parallel form to serial form and vice versa,
said master data link providing a plurality of input/output ports each connected to a said external data-carrying line,
whereby any said slave device can be connected to any of said plurality of input/output ports.

5. The system of claim 2,
said external data-carrying line being adapted to carry data at a first rate,
said resource memory data-carrying line being adapted to carry data at a second rate,
said master device further including
a first-in, first-out random access memory connected between said resource memory data-carrying line and said external data-carrying line,
said master device being responsive to said resource request value of said first semaphore area content to transfer said informational data between said requesting slave memory and said resource memory via said external data-carrying line, said first-in, first-out memory, and said resource memory data-carrying line.

6. A distributed data-processing system for processing informational data, comprising
a resource memory having
read-only memory for storing operational instruction data for said system, and
on-line storage for storing said informational data,
a master device having a master central processor, a master memory, a master data link, a resource control unit, master internal buses interconnecting said master central processor, master memory, master data link and resource control unit, and initiating means,
first and second slave devices each having
elements including a slave central processor, a slave memory, a slave data link, and
slave internal buses interconnecting the said elements of a said slave device
a data link data-carrying line connecting each said slave data link to said master data link,
a resource memory data-carrying line connecting said master resource control unit to said resource memory,
said master central processor having access means directly to read or write each said slave memory via said data link data-carrying line and said slave internal buses independent of said slave central processor,
each said slave memory providing a first dedicated semaphore area, each said slave central processor having means to set its said first semaphore area content to a service request value indicating a request for one of a set of master services, said services including access to said resource memory,
each said slave central processor being initially responsive to said initiating means to set its said first semaphore area content to a no-request value, said master central processor being responsive to said initiating means periodically directly to read said first semaphore area of each said slave memory, said master being responsive to a said service request value of a said first semaphore area content to provide said service, said master being responsive to completion of a said service to reset said first semaphore area content of said requesting slave device to a no-request value, said slave central processor being responsive to any value of its said first semaphore area content other than said no-request value to defer setting said semaphore to a service request value.

7. A distributed data-processing system for processing informational data, comprising a resource memory having
 read-only memory for storing operational instruction data for said system, and
 on-line storage for storing said informational data, a master device having a master central processor, a master memory, a master data link, a resource control unit, master internal buses interconnecting said master central processor, master memory, master data link, and resource control unit, and inititing means first and second slave devices each having
 elements including a slave central processor, a slave memory, and a slave data link, and
 slave internal buses interconnecting the said elements of a said slave device, said master internal buses and said slave internal buses being adapted to carry data in parallel form, said master data link and each said slave data link including means to reformat data from parallel form to serial form and vice versa, each said slave memory providing a first dedicated semaphore area, each said slave central processor having means to set said first semaphore area content of that said slave device to a service request value indicating a request for one of a set of master services, said services including access to said resource memory and print requests, said first slave device futher providing keyboard input means connected to said first slave internal buses for inputting said informational data and for inputting a print command to print particular informational data stored in said resource memory, said second slave device further providing print output means connected to said second slave internal buses for printing said stored informational data, and said second slave device memory having a second dedicated semaphore area, said second slave device central processor being responsive to said intiating means periodically to read said second semaphore area, each said slave central processor being initially responsive to said initiating means to set its said first semaphore area content to a no-request value, said first slave device central processor being responsive to said input print command to set its said first semaphore area content to a print request value, said system further comprising a data-carrying line connecting each said slave data link to said master data link, said data-carrying lines being adapted to carry data in serial form, and a resource memory data-carrying line connecting said master resource control unit to said resource memory, said master central processor having access means directly to read or write each said slave memory via said data-carrying line and said slave internal buses independent of said slave central processor, said master central processor being responsive to said initiating means periodically to read said first semaphore area of each said slave memory, said master being responsive to a said resource access service request value of a said first semaphore area content directly to transfer data between said resource memory and the said slave memory of the requesting slave device via said resource memory data-carrying line, said data link data-carrying line and said requesting slave internal buses independent of said requesting slave central processor, said master being responsive to a said print request value of said first slave device first semaphore area content to set said second slave device second semaphore area content to a print request value, said master being responsive to completion of a said service to reset said fist semaphore area content of said requesting slave device to a no-request value, a said slave central processor being responsive to any value of its said first semaphore area content other than said no-request value to defer setting its said first semaphore to a service request value, said second slave device central processor being responsive to said second semaphore area content print request value in its own memory to set its said first semaphore area content to a resource request value for accessing said stored particular informational data to be printed.

8. The system of claim 7, wherein
said data-carrying line is adapted to carry data at a first rate,
said resource memory data-carrying line is adapted to carry data at a second rate,
said master device further including
 a first-in, first-out random access memory connected between said resource memory data-carrying line and said external data-carrying line,
 said master device being responsive to said resource request value of said first semaphore area content to transfer said informational data between said requesting slave memory and said resource memory via said external data-carrying line, said first-in, first-out memory, and said resource memory data-carrying line.

9. The system of claim 7, wherein
said master data link provides a plurality of input/output ports each connected to a said external data-carrying line,
whereby said slave device can be connected to any of said plurality of input/output ports.

10. The system of claim 7, further including a cathode ray tube display means connected to said master device for displaying said informational data.

* * * * *